United States Patent [19]
Downs et al.

[11] Patent Number: 5,466,407
[45] Date of Patent: Nov. 14, 1995

[54] INCINERATION RESIDUE TREATMENT PROCESS

[75] Inventors: James J. Downs, Narberth; William A. Roberts, Berwyn, both of Pa.

[73] Assignee: Rolite, Inc., Wayne, Pa.

[21] Appl. No.: 195,295

[22] Filed: Feb. 10, 1994

Related U.S. Application Data

[63] Continuation of Ser. No. 877,329, May 1, 1992, Pat. No. 5,286,430, which is a continuation-in-part of Ser. No. 731,528, Jul. 17, 1991, abandoned, which is a continuation of Ser. No. 366,158, Jun. 14, 1989, Pat. No. 5,037,286, which is a continuation-in-part of Ser. No. 211,267, Jun. 24, 1988, abandoned.

[51] Int. Cl.$^6$ .............................. B29B 9/08; B29C 43/02; B29C 67/02
[52] U.S. Cl. ........................... 264/115; 264/117; 264/333
[58] Field of Search .................................. 264/112, 117, 264/333, 115; 106/703, 709, 697, 710; 425/222; 23/313 R; 427/212, 214, 215; 118/418; 405/129

[56] References Cited

U.S. PATENT DOCUMENTS

| | | | |
|---|---|---|---|
| 3,192,060 | 6/1965 | Tilsen | 106/709 |
| 3,980,558 | 9/1976 | Thompson | 210/59 |
| 4,397,801 | 8/1983 | Minnick | 106/709 |
| 4,565,468 | 1/1986 | Crawford | 405/270 |
| 4,731,120 | 3/1988 | Tuutti | 106/697 |
| 4,741,782 | 5/1988 | Sytron | 106/709 |
| 4,744,829 | 5/1988 | Eirich et al. | 106/703 |
| 4,753,551 | 6/1988 | Brueggemann et al. | 405/128 |
| 4,908,129 | 3/1990 | Finsterwalder et al. | 210/170 |

*Primary Examiner*—Mary Lynn Theisen
*Attorney, Agent, or Firm*—Paul and Paul

[57] ABSTRACT

Residue produced by incineration of commercial, industrial or municipal waste is treated to remove oversize material and ferrous materials. The moisture content of the untreated residue is adjusted, and the residue is mixed with Portland cement to partially aggregate the residue into a free-flowing, granular material containing no more than about five percent by weight fines and having a hydraulic conductivity of at least about 0.001 cm/sec after curing for 24 hours. The treated residue can be used to form a gas-venting layer for a landfill, and retains its good hydraulic conductivity as it cures into a cohesive mass, such that leaching of hazardous materials is reduced.

21 Claims, 8 Drawing Sheets

INCINERATION RESIDUE TREATMENT PROCESS

This is a continuation of application Ser. No. 07/877,329, filed on May 1, 1992, now U.S. Pat. No. 5,286,430, which is a continuation-in-part of U.S. patent application Ser. No. 731,528, filed Jul. 17, 1991, now abandoned, which is a continuation of Ser. No. 366,158, filed Jun. 14, 1989, now U.S. Pat. No. 5,037,286, which was a continuation-in-part of Ser. No. 211,267, filed Jun. 24, 1988, now abandoned.

BACKGROUND OF THE INVENTION

1. Field of the Invention

The present invention relates to a process for the treatment of waste materials, and in particular to a process for the treatment of incinerator residue produced from commercial, industrial and municipal refuse, to an aggregate material produced by that process, and to the use of that aggregate material.

2. Background of the Invention

The problems associated with disposing of waste materials in an environmentally sound manner are well known. One of the serious concerns our consumption-oriented modern industrial society faces is what to do with municipal refuse. Traditional solutions, especially disposal of unprocessed refuse in landfills, are rapidly losing their viability, as acceptable disposal sites become increasingly difficult to find, and as such sites have become recognized as sources of unacceptable pollution of their environs.

while raw municipal solid waste contains many materials that can be separated and recycled, there is always a residuum which must be somehow disposed of. One general approach to municipal waste disposal has been incineration, often now combined with cogeneration of power such as in modern "trash-to-steam" facilities. Municipal refuse incinerators must include means for minimizing the emission of environmentally harmful substances, such as HCl, $SO_2$, $NO_x$, polynuclear aromatic compounds, and dioxin. In addition, ash is a major product of municipal trash incinerators which itself must be disposed of in an environmentally acceptable manner. Two types of residue are produced by incineration: low density fly ash which must be removed by filtration, electrostatic precipitation, or a similar technique from the stack exhaust, and bottom "ash," a residue which is too dense to be carried with the hot exhaust gases.

Incineration may concentrate toxic materials present at low levels in the raw refuse so that the ash produced contains environmentally unacceptable proportions of pollutants such as mercury and cadmium. If untreated incinerator ash is disposed of in a landfill, such toxic material may leach out and seriously contaminate groundwater in the vicinity of the landfill. Disposing of incinerator ash by "landfilling" the ash has been a common solution to the disposal problem. Clearly, there is a need for a process for treating incinerator ash to reduce the likelihood that toxic materials present in the ash, such as "heavy metals" including mercury and cadmium, will leach out to contaminate local groundwater in the landfill area. Many processes have been proposed for the incineration of municipal wastes and treatment of the residues formed thereby. For example, it has been suggested that fly ash produced by incinerating municipal waste be treated with a slightly acid medium to remove soluble materials, that the soluble contaminants removed thereby be treated chemically to precipitate them, and that the precipitate be immobilized as a compact material. At the same time it has been advised that the incinerator itself be operated to produce an inert slag which can be reused.

Hot bottom "ash" from a municipal refuse incinerator may be first treated by quenching with water in a quench tank. The wet quenched bottom ash can be dried, screened to remove bulk metal, and separated into magnetic and non-magnetic fractions using a magnetic separator. The fly ash can be disposed of separately, such as by use as a supplement for cement, or it can be combined with the residue in the quench tank. The non-magnetic fraction can be used as an aggregate for subbases or base courses (such as for highway construction or the like), as an aggregate for Portland cement concrete and articles formed therefrom such as concrete masonry blocks, or as an aggregate for bituminous concrete. The non-magnetic fraction includes glass, sand, slag, ash and some magnetic materials. The use of this fraction as an aggregate in Portland cement concrete is complicated by a potential alkali-glass reaction which can cause concrete expansion detrimental to the concrete.

The non-magnetic fraction can be further processed. For example, the glass fraction can be separated and used to produce structural materials such as bricks. The waste glass can be ground, mixed with clay and sodium silicate, pelletized and sintered to give expanded glass aggregate pellets useful as aggregate for Portland cement concrete.

Fine particulate waste can be agglomerated by adding water or a binder liquid to the dry waste powder in a disk or barrel pelletizer, the resulting green pellets being subsequently fired in a rotary kiln or traveling grate sintering machine to produce aggregate for concrete. The rotary kiln can produce a lightweight expanded aggregate having a fused surface, having low water absorption and suitable for cast-in-place concrete. The traveling grate sintering machine produces a more porous aggregate which can be used in concrete blocks.

Portland cement has been used to trap a wide variety of toxic wastes in a solid matrix; including arsenic (U.S. Pat. Nos. 4,329,179; 4,142,912; 4,046,674; 3,933,624; 3,804, 750), radwaste (U.S. Pat. Nos. 3,988,258; 4,122,028; 4,017, 417; 4,504,317; 4,530,723; 4,533,395), fossil fuel ash (U.S. Pat. No. 4,726,710), acidic liquors containing heavy metals, such as from electroplating and metal finishing (U.S. Pat. No. 4,741,776), washing water filter sludge (U.S. Pat. No. 4,304,674), and oxysludge from steel manufacture (U.S. Pat. No. 4,601,832).

Despite the progress which has been made toward addressing the problems posed by the disposal of solid wastes from municipal, commercial and industrial sources, there remains a substantial need for an inexpensive, reliable method for treating incinerated waste, which often contains significant amounts of toxic materials, such as heavy metals, so that such incinerated waste can be disposed of in an environmentally sound manner.

In attempting to minimize the leaching of hazardous materials from waste such as incinerator ash, many approaches have focused, with varying degrees of success, on isolating the hazardous material from its environment, such as by coating it with an impervious barrier of Portland cement, by vitrification, by the use of impervious plastic barriers, and like measures all aimed at reducing the flow of ground water through the material.

While the incineration of waste materials is becoming an increasing popular response to the disposal problem, there has already been a substantial capital investment in incineration facilities by municipal authorities and by industry. Thus, there is a need for an incinerated waste treatment process for carrying out this process which build on this past capital investment and which can also be used in future incineration facilities.

There is a growing need for a process providing for the long term disposal of incinerator ash from municipal solid waste. Further, there is a need for a treatment process which can be used in either a batch or continuous mode to treat incinerator residues. Similarly, there is a need for a process which can treat incinerator residues to provide a useful construction material, the size and strength of which can be controlled in the production process.

SUMMARY OF THE INVENTION

The present invention provides an advantageously simple and inexpensive process for treating residues produced by the incineration of commercial, industrial or municipal waste. The process of the present invention can be carried out on-site at the point of generation or storage of the residues, or near or at a disposal site such as a landfill.

The process comprises mixing the untreated residue with an aggregation agent to produce a mixture of untreated residue and aggregation agent, and aggregating the mixture of aggregation agent and untreated residue into a free-flowing, granular treated residue. Preferably, Portland cement is used as the aggregation agent, and the moisture content of the untreated residue is adjusted prior to mixing the cement and the untreated residue, such that the proportion of fines in the treated residue is less than about five percent by weight.

The process further comprises forming the treated residue into a layer, such as a cover layer for a landfill, or a structural road base. The layer has high hydraulic conductivity, preferably greater than 0.001 cm/sec, such that water drains quickly through it and leaching of hazardous materials is consequently reduced. The treated residue can be advantageously used to form a grading or gas venting layer for a landfill including municipal solid waste. Subsequently, the cement-containing layer continues to cure as the layer becomes a cohesive mass while high hydraulic conductivity is maintained.

The process of the present invention advantageously provides a general increase in the average particle size of the untreated incineration residue, and a reduction in the proportion of fines, while simultaneously providing a free-flowing, easy-to-handle granular product. The increase in average particle size is accompanied by a decrease in the surface area of the material, yet the product is not monolithic. The product is a lightweight aggregate having improved leaching characteristics and high hydraulic conductivity.

In contrast to prior art processes, which pursue isolating the interior of waste material particles from their environment by applying impervious coatings, vitrification, encapsulation, and like techniques with the goal of reducing the hydraulic conductivity of the waste material particles as much as possible, the process of the present invention provides particles having increased hydraulic conductivity. It has unexpectedly been found that increasing the hydraulic conductivity of the waste material decreases leaching of hazardous materials therefrom. While not being bound by any particular theory or explanation of this phenonenom, it is thought that the reduced leaching is achieved by reducing the residence time of water in the waste material.

An important objective of the process of the present invention is the treatment of incinerator residues to inhibit the leaching of metals, including heavy metals, into the environment. In addition, it is an objective that the product be provided with good structural integrity when the ash residue is to be recycled. The process also provides a means of controlling leaching rates over long periods and means for tailoring the treatment to the analyzed composition of the incinerator residue.

In a presently preferred embodiment the process is adapted for treating incinerator ash including both bottom ash and fly ash with a substantial proportion of "fines," that is, particles with particle size less than about 100 microns.

The process optionally additionally comprises mixing a heavy metals treatment agent with the mixture of aggregation agent and untreated residue and forming pellets, and optionally providing a cementitious coating on the treated residue.

The heavy metals treatment agent, if one is to be used, can be diatomaceous clay, which is preferably added in a weight ratio of about 0.01 to 0.02 based on residue solids. However, the present process provides an improved light-weight aggregate and a landfill gas-venting layer with high hydraulic conductivity even in the absence of a heavy metals treatment agent.

The aggregation agent is preferably Portland cement, and the treated residue can be coated with Portland cement. Type II Portland cement is preferred. The proportion of Portland cement aggregation agent can be based on the moisture content of the untreated residue.

The cementitious material is believed to trap some of the soluble contaminants in the free water and react with them to insolubilize them. The cementitious material in the treated residue immediately begins to cure to provide a lightweight aggregate.

Preferably, the treated residue is simply conveyed to a stockpile where the cementitious material is permitted to cure for a short period of time, such as from about three to five days, and preferably at least about 18 hours. Ultimately, the treated residue is formed into a layer, such as a cover layer over a portion of a landfill, such as a gas venting or grading layer in a landfill cover. The cover layer is stable over time with respect to load and compaction, and while continuing to cure to provide a cohesive mass, retains good hydraulic conductivity.

DETAILED DESCRIPTION OF THE PREFERRED EMBODIMENTS

Figure 1:
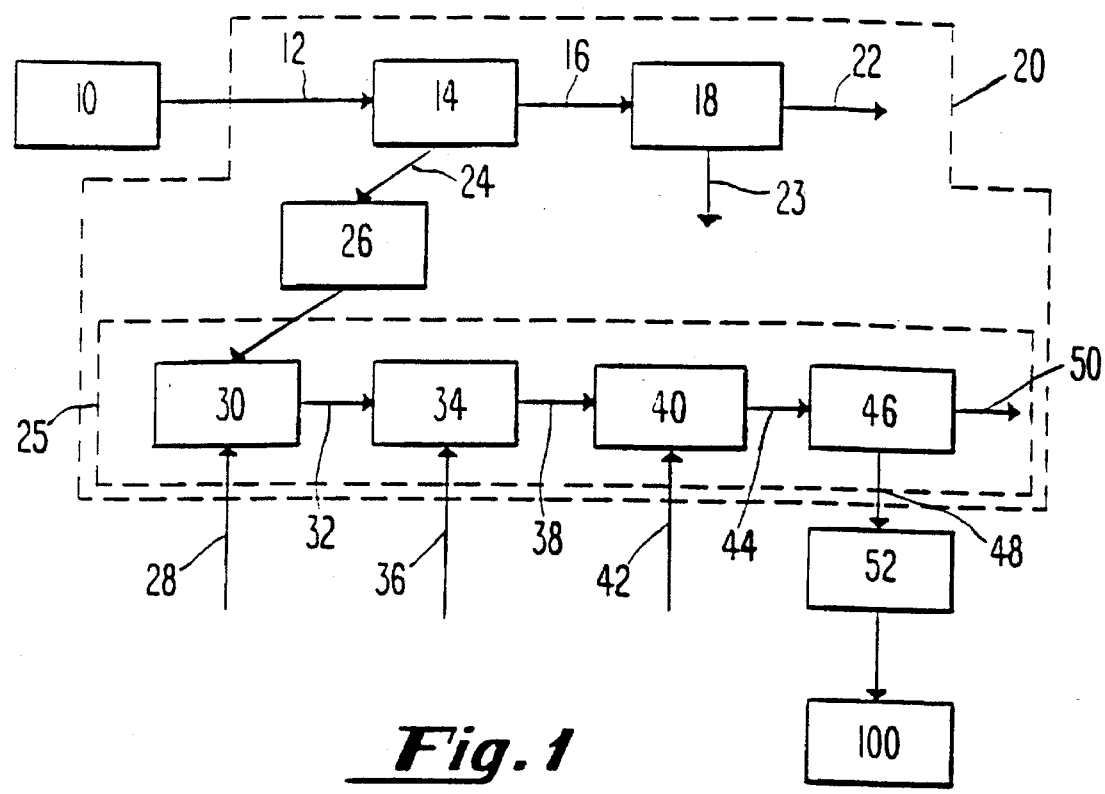
FIG. 1 is a schematic diagram illustrating an embodiment of the process of the present invention.

Referring now to the drawings in detail, reference is first made to FIG. 1, wherein a schematic illustration of the process of the present invention is provided.

A raw untreated residue 12 is produced by incineration of waste materials in an incineration facility 10. The incinerated waste materials can be any type of commercial, industrial or municipal waste, including garbage or trash from residential, commercial or institutional sources. One typical source of material for incineration is municipal solid waste ("MSW"). The composition of the residue will vary depending on the source and composition of the waste material fed to the incineration facility, the nature and efficiency of the incineration facility, the extent to which the waste material is pretreated before incineration, and like factors.

The waste material may contain one or more toxic components (e.g. trace heavy metals such as mercury, lead, or cadmium) which are concentrated by the incineration process in the residue, or the incineration process itself may produce toxic materials (e.g. dioxins, hydrogen halides such as hydrogen chloride and hydrogen fluoride, nitrogen oxides, and sulfur dioxide). The raw untreated residue of the incineration process can be referred to alternatively as raw untreated "ash," although its composition will reflect the composition of the waste material incinerated. When the waste material incinerated is municipal waste, the composition of the raw uncreated "ash" can include ash from the combustion of organic materials, glass, ferrous and nonferrous metals, unburned combustible materials, slag, ceramics, etc.

The incineration facility can be a municipal "trash-to-steam" facility in which municipal waste is incinerated and power in the form of steam or electricity is cogenerated. Alternatively, the incineration facility can be specially adapted to the incineration of specific waste streams, such as those generated by chemical manufacturing processes, paper production, mineral processing, and the like. The raw untreated residue or ash can be bottom or "heavy" ash (with a average particle size on the order of about three-eights inch), fly ash (with an average particle size passing about 200 mesh), or a mixture of bottom ash and fly ash. As supplied to the process of the present invention, the raw untreated residue can include a substantial proportion of moisture. For example, the raw untreated residue can be obtained directly from an incinerator quench tank in which hot bottom ash from the incinerator's incineration chamber is deposited.

It is preferred that the untreated waste material be the product of a "good burn" and be substantially free from unburned refuse. If the incinerator is operated to provide an improper loss-on-ignition, the unburned refuse resulting can have an adverse effect on the durability of the product of the process of this invention.

Some incinerators are constructed so that a waterfilled quench tank serves as an emission-limiting liquid seal between the incineration chamber and the environment. Quenched, raw untreated bottom ash will typically be withdrawn from the quench tank at a temperature elevated above ambient by a drag conveyer or the like. The bottom ash can be subsequently mixed with fly ash obtained from electrostatic precipitators, filter bags, or like means for reducing the emission of fine particulates from the flue of the incineration facility. The raw untreated ash can be treated immediately after discharge from the quench tank or it can be stored temporarily on-site after discharge. The temperature and moisture content of stored ash can differ substantially from those of raw untreated ash immediately after discharge from the quench tank.

The raw untreated residue 12 is delivered by suitable means to a treatment apparatus 20, such as disclosed in U.S. Pat. No. 5,037,286, herein incorporated by reference.

The process can be carried out continuously as residue is discharged from an incinerator, or batch-wise to treat accumulated residues.

Preferably, the treatment apparatus 20 is situated proximate the landfill in which the product of the process of the invention will be employed. Typically, landfills are not situated near the incinerator which generates the raw untreated residue, and as it is less costly to transport the untreated waste material to the landfill than the treated residue, economics dictate that the treatment apparatus 20 be located near or at the landfill. On the other hand, depending on the mode of transportation, and other factors, it may be desirable to situate the treatment apparatus 20 at or near the untreated residue generator or incinerator, and ship treated residue to the landfill for use there.

Untreated residue 12 is typically stored in the open and is exposed, and its moisture content is consequently variable, ranging, for example, between about 10 percent and 22 percent by weight.

During initial processing in the treatment apparatus 20. the raw untreated residue is separated into an undersize fraction 24, for example, material smaller than about two inches (five centimeters) in any dimension, and an oversize fraction 16, such as very large or bulky materials, for example, material larger than about five centimeters in any dimension, by suitable grading means or screens 14. The oversize fraction 16, which can make up about 20 percent of the total raw untreated residue, is separately disposed of, as most of the oversize fraction 16 obtained from incineration of municipal waste is bulky ferrous and non-ferrous metal which can easily be recycled. Ferrous metal 23 is separated from the oversize fraction 16 using magnetic extraction 18 and recycled, and the remaining oversize fraction 22 can be disposed of in the landfill. The undersize fraction 24 can be stored temporarly until downstream portions of the treatment apparatus 20 are available to process it.

The weight of the undersize fraction of the untreated residue 24 (referred to hereinafter alternatively simply as "the untreated residue 24") entering the treatment apparatus 20 can be continuously monitored. Other physical characteristics of the untreated residue 24, such as the temperature and the moisture content, can also be monitored.

The moisture content of the untreated residue 24 and is a key property in the process of this invention, and is typically measured pursuant to ASTM C 566-84.

The measured characteristics of the untreated residue 24 are employed as independent variables for calculating values for dependent process variables such as motor speeds for motors powering conveyers feeding streams of solid treatment materials, valves delivering streams of liquid treatment materials, devices such as step motors controlling treatment process dwell times, etc. In calculating values for the dependent process variables, an algorithm based on functional relationships derived from the physical and chemical characteristics of previously taken samples of untreated residue 24 and treated samples can be used. These characteristics can be examined by laboratory determinations of percentage moisture, pH, particle size and particle size distribution, and chemical composition, including the presence, amount, and chemical state (e.g. free metal or soluble or insoluble salt or complex) of heavy metals such as lead, mercury, cadmium, and arsenic, et al.

For example, in the presently preferred embodiment of the process of the present invention, a quantity of stored untreated residue 24 sufficient for a day's production is selected and its moisture content is measured. This untreated residue 24 is then conveyed to an aggregating apparatus 25 by a suitable means such as a walking floor conveyer 26 equipped with water spraying devices for adding moisture to the untreated residue 24, the rate at which water is added being determined by the measured moisture content of the untreated residue 24 and a target moisture level. The moisture content of the untreated residue 24 after spraying is also measured. Because untreated residue 24 is typically stockpiled for some period before processing, it tends to lose moisture to the environment in the absence of precipitation. Spraying water on the untreated residue 24 has been found to reduce fines in the product.

Preferably, in this embodiment the untreated residue 24 has a free water content of from about 20 percent to 30 percent after spraying. A free water content of about eighteen percent by weight after spraying is especially preferred. In any event the free water content is selected to provide enough water to permit added cementitious aggregation agent to cure sufficiently in a twenty-four hour period so that routine handling of the product (e.g. by moving the product to a remote stockpile with a conveyor or payloader or the like) will not significantly reduce the average grain size of the product, that is, the average grain or particle size will not decrease by more than 0.1 percent. On the other hand, the amount of free water is less than that to fully cure the added cement. That is, the ratio of water to cement is maintained so that the cement in the product can be described as "water-starved."

The moisture content of the untreated residue 24 can be continuously monitored and compared with the predetermined minimum moisture content, and, if the monitored actual moisture content falls below the predetermined minimum, the moisture content of the untreated residue 24 can be increased to the predetermined minimum moisture content, if desired.

Often the moisture content of the untreated residue 12 will be excessive, as when the untreated residue 12 is delivered directly from an incinerator quench tank. In this case, excess water can be permitted to drain.

In one embodiment of the process of the present invention, a heavy metals treatment agent 28 is mixed with the undersize fraction 24 of the untreated residue 12.

In this embodiment, the aggregation apparatus 25 functions as a pelletizer, providing discrete pellets or balls of product. In contrast, in the presently preferred embodiment, no heavy metals treatment agent 28 need be employed, and while the average particle or grain size of the untreated residue increases on treatment, discrete pellets or balls of treated residue are not formed. In this case, the aggregation apparatus 25 functions to mix the untreated residue 24 and an aggregation agent 38 and provide for the formation of aggregated product.

The heavy metals treatment agent 28 can be a clay, and is preferably a high surface area, high silica, low moisture content type of clay, such as diatomaceous clay. Other examples of clays which can be used include montmorillonite (bentonite), attapulgite, kaolinite, illite, sepiolite, mixtures thereof, and the like. The heavy metals treatment agent is preferably added to the untreated residue in a weight ratio of from about 0.01 to 0.02 based on the solids of the untreated residue. It is an advantage of the process of the present invention that a relatively non-chemically reactive silicate like diatomaceous clay can be used, as opposed to prior art methods which employ a combination of a chemically reactive silicate and cement.

One or more additional other heavy metal treatment agents can also be added to the untreated residue, if desired.

However, suprisingly, it has been found that diatomaceous clay, which is believed to be relatively unreactive chemically, is unexpectedly effective as a heavy metals treatment agent when the preferred aggregation agent, Portland cement, is used in the process of the present invention. An unexpected reduction in the leaching of heavy metals from the product of the process of this invention is observed when the preferred heavy metal treatment agent is used in combination with the preferred aggregation agent.

Heavy metal treatment agents which tend to react with heavy metals or soluble salts of such heavy metals to form water insoluble salts, compounds or compositions can also be added. For example, an additive containing at least one sulfate, such as alum, at least one alkaline metal carbonate, bicarbonate, or silicate, such as calcium carbonate, and at least one alkaline earth metal hydroxide, such as calcium hydroxide, can be added to the untreated residue, such as disclosed in U.S. Pat. No. 4,209,335. Alternatively, a heavy metal treatment agent such as an equimolar mixture of dry lime and an aqueous solution of an alkali metal sulfide, such as disclosed in U.S. Pat. No. 4,629,509 for the immobilization of lead and cadmium in fly ash, can be employed. Similarly, an additive such as a water soluble salt of manganese or an alkaline earth metal reactive, such as disclosed to be useful in U.S. Pat. No. 4,142,912 for the immobilization of arsenic wastes, can be used. A series of heavy metal treatment agents can also be used. For example, as disclosed in U.S. Pat. No. 4,601,832, the untreated residue can be first acidified with an acid solution of a metal of Group VIIa or VIII, such as iron or manganese, and alkali can be subsequently added to entrap the heavy metal in the precipitating hydroxide. Other heavy metal treatment agents which can be used are those which believed to provide a hydrophobic environment for the heavy metal ions, such as the lipids employed for this purpose disclosed in U.S. Pat. No. 4,226,631.

In one embodiment of the present invention, the heavy metals treatment agent 46 is cored with the untreated residue 24 at a rate calculated to provide a predetermined weight ratio of heavy metals treatment ratio to untreated residue 24. The weight ratio of heavy metals treatment agent 46 to untreated residue 24 can be based on prior laboratory determinations of chemical and/or physical characteristics of the untreated residue 24, such as the percentage moisture, temperature, pH, particle size distribution, surface area, and the type and percentage of contaminants, including heavy metals such as lead, cadmium, mercury and the like.

In addition, or alternatively, one or more of the physical and chemical properties of the untreated residue 24 can be monitored. This information can be used, along with the information about the quantity of untreated residue 24 to determine a target heavy metals treatment agent 44 to untreated residue 24 weight ratio, and to control operation of the apparatus to provide this target weight ratio.

When more than a single heavy metals treatment agent is used, two or more heavy metals treatment agents can be premixed to form a generally homogeneous mixture. Alternatively, and when the two or more heavy metals treatment agents will not form a physically generally homogeneous mixture, as when both a hydrophobic solid and a hydrophilic liquid are employed, separate storage, control and delivery can be provided.

In the presently preferred embodiment of the process of the present invention, an aggregation agent 38, preferably Type II Portland cement, is mixed with the untreated residue 24 to provide a treated residue, and the heavy metals treatment agent 28 is omitted.

The aggregation agent 38 is preferably a generally dry material with an affinity for water.

Reducing the proportion of fines in the untreated residue 24 is an important objective of the process of this invention. Grain size distributions, which are indicative of the proportion and type of fines in the tested material, are typically carried out pursuant to ASTM D 422-63.

Depending on initial conditions, a mixture of the untreated residue 24 and a heavy metals treatment agent 28, as in the second embodiment of the process of this invention, will generally have a significant moisture content, and will consequently tend to form a continuous phase.

The mixture of water and untreated residue is often thixatropic, as when the untreated residue 24 includes a substantial proportion of fines. In addition, a mixture of untreated residue 24 and heavy metals treatment agent 28 can also be thixatropic, as when the untreated residue 24 contains fly ash (with a high content of fines) and diatomaceous clay is used as the heavy metals treatment agent 28.

In this case the addition of the aggregation agent is believed to aid in breaking the liquid surface tension which may otherwise tend to maintain the continuity of the mixture, and to favor the formation of a discontinuous phase by collecting at the air-mixture interface. Preferably, the composition of the mixture is adjusted if necessary to favor the formation of a discontinuous phase when shear forces are applied to the mixture. As discussed below, the present process includes the formation of a discontinuous phase comprising pellets formed from the untreated residue 24, the optional heavy metals treatment agent 28, and the added aggregation agent 36.

In addition to favoring this change in the physical state of the mixture of the untreated residue 24 and the optional heavy metals treatment agent 28, the aggregation agent 36 is preferably selected to be reactive with one or more of the heavy metals and/or other toxic contaminants in the untreated residue 24 and to thereby provide an additional means of immobilizing such toxic contaminants. For example, when Portland cement is used, it is believed that water soluble salts of heavy metals tend to diffuse from the untreated residue to the constituent particles of the Portland cement where the heavy metal ions react and tend to form water-insoluble precipitates with certain constituent chemical species of the Portland cement.

While Type II Portland cement is preferred for both the preferred embodiment and the second embodiment, other types of hydraulic cements can also be used as an aggregation agent and/or to coat pellets formed from the mixture of heavy metals treatment agent and untreated incinerator residue. For example, pozzolanic cements, lime cements, grappler cements, and other types of Portland cement could also be used.

In the second embodiment, when a hydraulic cement is used, the moisture present in the mixture of the untreated residue and the heavy metals treatment agent will tend to cause the hydraulic cement to cure to form a solid, continuous binder for the untreated residue/heavy metals treatment agent mixture having high compressive strength. If desired, the moisture content of the untreated residue or of the untreated residue/heavy metals treatment agent mixture can be adjusted to enhance the compressive strength of the cured binder formed by the hydraulic cement. For example, the moisture content can be increased by addition of water. However, the addition of water is likely to increase the weight of aggregation agent required to achieve conditions favoring formation of a discontinuous phase. Preferably, the proportion of aggregation agent added is selected to both provide conditions favoring formation of a discontinuous phase and to aid in immobilizing toxic contaminants of the untreated residue. When the untreated residue 24 is bottom ash from a municipal incinerator, and the heavy metals treatment agent 28 is diatomaceous clay added at a weight ratio of about 0.01 to 0.02 based on untreated residue solids, and the aggregation agent 36 is Type II Portland cement.

The weight ratio of aggregation agent 36 to untreated residue solids depends to some extent on the identity of the heavy metal ion or ions which it is desired to immobilize. For lead this ratio is preferably from about 0.07 to 0.14. While greater proportions of aggregation agent 36 can be used, such as 0.21, a proportionate decrease in the leaching of the heavy metal ion is not observed.

When a hydraulic cement is used as an aggregation agent in the presently preferred embodiment, the type of hydraulic cement used and the ratio of hydraulic cement to untreated residue and optional heavy metals treatment agent mixture are preferably selected to control reduction of the surface area of the product by reducing the fines within the product formed during cure of the hydraulic cement aggregation agent. In the presently preferred embodiment, the target water to cement weight ratio is 0.4, and water is added at a rate of about six gallons per minute, or about 7 gallons per ton of untreated residue being processed.

It is preferred that the product of the preferred embodiment of the process of this invention contain no more than about five percent by weight of fines.

When a cementitious coating is to be applied to the pellets formed by the second embodiment of the present process, it is also desirable to control expansion of the pellets formed during cure of the hydraulic cement aggregation agent by controlling composition. Depending on the composition of the untreated residue/heavy metals treatment agent mixture, the hydraulic cement may tend to expand as it cures. For example, when the untreated residue contains sulfate, as in the form of calcium sulfate dihydrate (gypsum), a hydraulic cement which contains tricalcium aluminate, such as Portland cement (approximately 10% w/w tricalcium aluminate), will tend to expand on cure because the mineral etteringite is formed by reaction between sulfate and tricalcium aluminate. Untreated residues containing sulfate are encountered when scrubber sludge from facilities having acid gas scrubber systems is included in the untreated residue. As discussed below, in the process of the present invention a cementitious coating is provided on the green pellets formed from the mixture of untreated residue, heavy metals treatment agent, and aggregation agent. Preferably, about 10 percent by weight of the total amount of cement is used as aggregation agent in that case. When Portland cement is used to provide a cementitous coating, the cured cementitous coating will tend to have high compressive strength, but low tensile strength, and will tend to be susceptible to cracking if the interior of the pellets expand after the Portland cement coating has become substantially cured. Thus, when the untreated residue contains sulfate, it may be desirable to use a tricalcium aluminate-free material, such as an aluminous cement as disclosed in U.S. Pat. No. 4,329,179, as an aggregation agent.

In one embodiment of the process of the present invention Type II Portland cement is used both as the aggregation agent and to provide a cementitious coating on the green pellets formed from the mixture of untreated residue, heavy metals treatment agent and aggregation agent. As shown in FIG. 1, in this embodiment of the present invention, Portland cement is preferably delivered in two streams 36, 42, the first 36 providing Portland cement as an aggregation agent to the mixture 32 of heavy metals treatment agent 28 and untreated residue 24, the second stream 42 providing a cementitious coating on the pellets of untreated waste material, heavy metals treatment agent and aggregation agent produced by a pelletizing apparatus 25.

The undersize fraction of untreated residue 24 and optionally the heavy metals treatment agent 28 are delivered to a pelletizing or pellet-forming apparatus 25 such as a rotatable mixing drum. The rotatable mixing drum 25 in generally divided functionally into four sections 30, 34, 40, 46. In a first section 30 the untreated residue 24 is optionally mixed with heavy metals treatment agent 28. In a second section 34 the aggregation agent stream 36 of the Portland cement is mixed with the mixture 32 of untreated residue 24 and heavy metals treatment agent 28 formed in the first section 30.

In the presently preferred embodiment of the process of this invention, no heavy metals treatment agent per se is employed, such that the untreated residue 24 is mixed directly with a Portland cement aggregation agent 36 proximate the entrance to the aggregation apparatus 25.

Mixing with the aggregation agent 36 is believed to aid in breaking the surface tension of the moisture in the mixture and favor formation of discrete pellets or pellets 38 of an uncured or "green" mixture of aggregation agent 36 and untreated residue 24, and optionally the heavy metal treatment agent 28, depending on the moisture content. In the presently preferred embodiment, there is an increase in average grain or particle size of the untreated residue 24, but discrete pellets or balls are not formed, as the weight ratio of added water to cementitious aggregation agent 38 is selected so that the cement is actually "water-starved."

When a mixture 32 of untreated residue 24 and heavy metals treatment agent 28 is thixatropic, as when it comprises fly ash and diatomaceous clay, discrete pellets or pellets will tend to be formed in the mixing drum 25 even in the absence of the aggregation agent 36. Under the shearing forces exerted on the mixture by the rotating drum, it is believed the viscosity of the mixture decreases and some phase separation takes place, with excess moisture tending to go to the surface of the discrete pellets formed. The "aggregation" agent 36 will then tend to coat the exterior surfaces of the pellets. In particular, when Type II Portland cement is used as the aggregation agent, the cement is found to coat pellets of the mixture of fly ash and diatomaceous clay. While a small proportion of the added aggregation agent may work its way into the interior of the pellets, most of the added aggregation agent 36 in this case will adhere to the exterior surface of the pellet, tending to form a coating thereover.

The mixing time and the size of the pellets produced by the process are related. If the pellets are rotated for too long in the drum, their average size may actually begin to decline, and a short mixing time is usually preferred.

A second cementitious coating stream 42 of the Portland cement can be subsequently mixed with the green pellets 38 in a third functional section 40 to provide coated pellets 44 having an uncured cementitious coating. When the aggregation agent is Portland cement, this second addition of Portland cement tends to build up the thickness of the cementitious coating to the extent desired. In an optional fourth section 46 of the mixing drum 25, the coated pellets 38 are separated into a first and a second size fraction 48, 50 before being discharged from the mixing drum 25.

The use of cement as an aggregation agent and optionally as a coating on the pellets including the incinerator residue results in a significantly more efficient use of cement than in prior art processes which use wastes as fillers or aggregates in bulk cement.

As the aggregation stream 36 of the Portland cement contacts the moist surface of the mixture 32 of the untreated residue 24 and the optional heavy metals treatment agent 28, it is believed to tend to soak up free water and tends to break up the surface tension or meniscus of the aqueous "binder" which otherwise tends to hold the particles of the untreated residue 24 or the mixture 32 of untreated residue 24 and heavy metals treatment agent 28 together as a substantially continuous phase. As the mixing drum 25 rotates, a shearing force is imposed on the mixture including the untreated incinerator residue 24, the optional heavy metals treatment agent 28, and the aggregation agent 36, causing the mixture to break up into discontinuous pieces or pellets, as the attractive force of the aqueous binder has been reduced by the addition of the aggregation agent 36. The rotation of mixing drum 25 then causes the individual pellet or pieces of the mixture to roll up into a generally spherical shape, providing pellets 38 of a "green" or uncured mixture of treated residue 24 and aggregation agent 36. The regularity of the shape of the green pellets 38 depends on a number of factors, such as the particle size distribution of the untreated residue.

Similarly, the average size and size distribution of the treated residue 48 in general are believed to depend on a number of factors, such as the moisture content of the untreated residue 24, the ratio of optional heavy metals treatment agent 28 to untreated residue 24, the ratio of aggregation agent 36 to the untreated incinerator residue 24, the amount of free water added just before the untreated residue enters the aggregation apparatus 25, and the like. Preferably, these factors are controlled to provide treated residue particles or grains 48 having a predetermined average size, such as an average size suitable for use in forming a cover layer for a landfill, and a low level of fines, preferably less than five percent by weight. By "fines" is meant particles having a size less than or equal to 100 microns. Preferably, the product of the presently preferred embodiment has a grain size distribution such that the overall material can be classified as a "well graded sand" (SW) or "well graded gravel" (GW) according to the Unified Soil Classification System.

In the second embodiment of the present process, the average size of the product formed is greater, on the average, than in the presently preferred process, in that pellets or balls are formed.

As the green pellets 38 roll within the mixing drum 25, they are believed to become more dense as free water within the green pellets 38 is driven by the centrifugal forces generated by rolling toward the exterior surfaces of the green pellets 38. The free water may carry with it dissolved toxic contaminants.

The green pellets 38 formed in the second section 34 roll down into the optional third or coating section 40 of the mixing drum 25.

The optional cementitious coating-forming stream 42 of Portland cement is directed to impinge on the green pellets 38 in the third section 40 of the mixing drum 25. The Portland cement, or cementitious coating-forming agent, sticks to the moist exterior of the green pellets 38 and forms an uncured cementitious coating or shell thereon and to thus provide coated pellets 44. The thickness of the uncured concrete coating or shell depends on the moisture available at the surface of the green pellets 38, and the rate at which Portland cement is delivered in the cementitious coating stream 42. Preferably, the rate at which Portland cement is delivered in the cementitious coating stream 42 is adjusted so that substantially all the Portland cement delivered in this stream is consumed in forming the cementitious coating on the green pellets 38, and little free, unreacted Portland cement is discharged from the mixing drum 25.

The thickness of the cementitious coating is preferably sufficient to provide coated pellets 44 which have substantial strength when the Portland cement aggregation agent in the interior of the coated pellets 44 and the cementitious coating on the exterior of the coated pellets 44 have cured. Preferably, the thickness of the coating is sufficient so that it will not fracture when the coated pellets 44 are subsequently subjected to compressive forces, as when such coated pellets 44 are ultimately used in a landfill, or alternatively used as a construction aggregate.

Preferably, the thickness of the cured coating is at least about 0.05 cm.

After the green pellets 44 have been coated in the third section 44 they roll into the fourth or screening section 46 of the mixing drum 25 which selects out a first size fraction of smaller pellets 48 and a second size fraction of larger pellets 50. The respective products can be bagged separately, or stockpiled for later use. Samples can be automatically taken to identify the the bagged product by key properties such as moisture content, and information which is relevant to monitoring the environmental responsibilities of the residue generator.

In the present application and claims, "moisture content" means both free water and bound water, including physically adsorbed and absorbed water.

It has been found that spraying the untreated residue 24 with water immediately before mixing it with Portland cement aggregation agent 36 advantageously reduces the fines content of the product of the presently preferred process. It is presently believed that the water so added is not immediately absorbed by the untreated residue 24, and that at least some portion is available as "free water" for reaction with the added Portland cement aggregation agent 36. Consequently, even when untreated residue is received with a moisture content which is measured to be within the range desired in the process, it is desirable to store the untreated residue to permit the untreated residue to dry to some extent before processing it, and to add back the lost moisture immediately before addition of the Portland cement aggregation agent. The proportion of water which it is desirable to add immediately before adding the Portland cement aggregation agent depends on the amount of cement added, in general it should be at least about 3 percent by weight, based on the weight of Portland cement.

The curing product can be placed in a stockpile in a holding area 52 for a predetermined period to allow the hydraulic cement curing process, and the concurrent reaction of the moisture in the mixture of untreated residue with the Portland cement, to continue. Preferably, the moisture content and the grain sizes of the product are measured after the product has been permitted to cure for a fixed period, such as three to five days, and preferably at least about eighteen hours, after having been processed in the aggregation apparatus 25. It is believed that if the product is handled too much before this initial cure period, a disadvantageous reduction in average particle size and increase in fines may result. Subsequently, the treated residue 48 can be transported from the holding area stockpile 52 and used to form a gas-venting layer in a landfill 100, a layer for a road base (not shown), or as an aggregate for making concrete (not shown).

In the presently preferred embodiment, the proportion of Portland cement added is 14 percent w/w based on the weight of the untreated residue, and the desired water-to-cement ratio is 0.4 on a weight basis.

In the present specification and claims, "free water" is the water on the surface of the untreated ash particles. Free water is also sometimes known as surface water. The "moisture content" of the ash is the water absorbed in bulk, plus the surface water. The amount of water to be sprayed on the ash depends on the initial ash moisture, and this is given below in Table A for a number of initial moisture values, along with the amount of cement added, to arrive at a water-to-cement weight ratio of 0.4 (14 lbs. cement added).

TABLE A

| | Feed Rates | | |
|---|---|---|---|
| Ash $H_2O$ percent | Ash lb/min. | Cement lb/min. | Water gal/min. |
| 30 | 1000 | 140 | 0.09 |
| 25 | 1000 | 140 | 2.11 |
| 20 | 1000 | 140 | 3.77 |
| 15 | 1000 | 140 | 5.05 |
| 10 | 1000 | 140 | 5.97 |
| 5 | 1000 | 140 | 6.53 |
| 0 | 1000 | 140 | 6.71 |
| 30 | 1500 | 210 | 0.13 |
| 25 | 1500 | 210 | 3.17 |

TABLE A-continued

| | Feed Rates | | |
|---|---|---|---|
| Ash H$_2$O percent | Ash lb/min. | Cement lb/min. | Water gal/min. |
| 20 | 1500 | 210 | 5.65 |
| 15 | 1500 | 210 | 7.58 |
| 10 | 1500 | 210 | 8.96 |
| 5 | 1500 | 210 | 9.79 |
| 0 | 1500 | 210 | 10.07 |

The product can be used as a construction material, such as a subbase for road construction. In this application the product has both good hydraulic conductivity which is retained over time and adhesive properties such that the product develops good cohesive strength over time.

Figure 2:
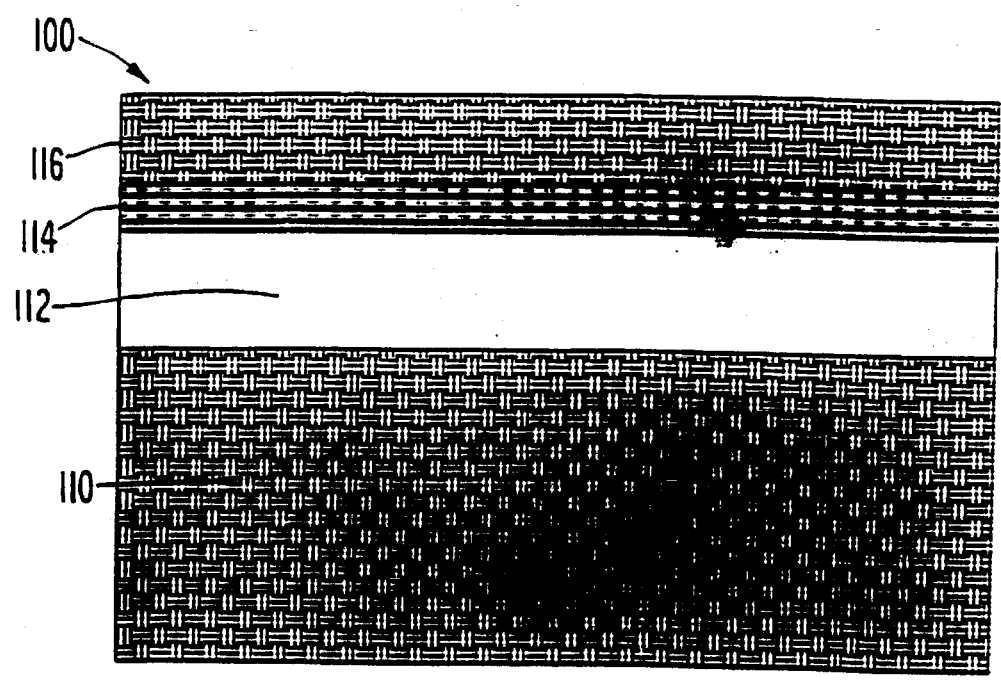
FIG. 2 is an exploded, fragmentary elevational view of a landfill cover layer provided by the process of the present invention.

An especially preferred use is to form a grading layer or gas-venting layer for a waste-disposal landfill. The construction and purpose of a gas-venting layer for landfills is discussed in A. Bugchi, *Design, Construction and Monitoring of Sanitary Landfill* (John Wiley & Sons, New York, 1990) at 168–169 and 201–202. Standards for providing a cover layer for closing a landfill are provided in *Solid waste Facility Disposal Facility Criteria*, 56 Fed. Reg. 50,978, 51,039–42, 51,050–51 (1991) (to be codified at 40 C.F.R. Parts 257 and 258). The construction of a sanitary landfill cover 100 is shown schematically in FIG. 2. The lowermost layer 110 is comprised of conventional municipal solid waste having an irregular upper surface and covered with a grading or gas-venting layer 112 having a thickness of from about 15 cm to 60 cm. Conventionally, the gas-venting layer is made up of SW or SP-type sand (poorly graded) and compacted to about 85 to 90 percent relative density. As the name implies, the gas-venting layer permits the flow of landfill-generated gases, methane and carbon dioxide, to venting or collection devices to avoid hazardous buildup of those gases within the landfill. The gas-venting layer 112 is in turn covered with a barrier or infiltration layer 114 formed from clay (such as SC, SM or MS clay) or a special plastic barrier material. The permeability of this layer must be equal or less than that of any liner used on the bottom of the landfill or no greater than $10^{-5}$ cm/sec, whichever is less. The purpose of the barrier layer 114 is to prevent water from entering the landfill and subsequently leaching out hazardous materials into the surrounding ground water. On top of the barrier layer 114 is an erosion layer of top soil 116, on the order of 30 cm to 100 cm thick, planted with grass and/or other soil-retaining vegetation. The cover should be durable, as leachate from the landfill must meet mandated standards for long after the landfill has been closed.

An important advantage of the process of this invention is that it produces a porous aggregate with high hydraulic conductivity, and having a low level of fines, less than five percent. The grain size distribution of the material does not substantially change during storage of the material prior to use in forming the landfill cover layer or other use, such as use as a grading material or subbase for a roadbed. The product of the process is durable, in the sense that successive wet and dry periods and freezing and thawing cycles do not significantly affect the hydraulic conductivity of the product. Preferably, the hydraulic conductivity of the product is at least about $1.0 \times 10^{-3}$ cm/sec for use in forming gas-venting cover layers.

The durability of the product is an important property for landfill cover applications. Precipitation exposes landfills to intermittent saturation with water, and the gas-venting layer should retain its hydraulic conductivity even after being repeatedly soaked and dried, such as may occur if the barrier layer is breached. Advantageously, the product of the present invention retains its hydraulic conductivity, even after repeated wetting and drying. In addition, it has been found that the product retains groundwater contaminents including calcium and sulfate better than untreated residue under intermittent leaching conditions. This is also important in the case of stockpiled product, which is typically directly exposed to the environment. In the case of stockpiled product, it has been unexpectedly found that leaching under saturated conditions is only weakly dependent on the height of the stockpile, suggesting that high stockpiles are favored to minimize leaching.

Depending on the thickness of the erosion and barrier layers and the geographically dependent depth-of-frost, the landfill gas-venting layer may be subject to periodic freeze-thaw cycling. Thus, the retention of hydraulic conductivity after freeze-thaw cycling is an advantageous property of the product of this invention. It is presently believed that the resistance to freeze-thaw degradation is related to the free volume between particles which exists in the product of the present invention.

The following examples are illustrative of the process and compositions of the present invention and will be useful to those of ordinary skill in the art in practicing the invention. However, the invention is in no way limited by these examples. Unless otherwise indicated all percentages are given on a weight basis in the following examples.

EXAMPLE 1

The process of the present invention was carried out on a laboratory scale as follows:

22.7 kg of untreated incinerator residue obtained from the Philadelphia Northwest Incinerator facility was added to the rotary drum of a portable cement mixer having a capacity of about 120 kg. An O'Haus digital balance was used to weigh materials. After about 30 seconds a predetermined amount of Celite® diatomaceous clay, available from Manville Corporation, was sprinkled over the incinerator residue to promote thorough mixing of the untreated incinerator residue and the diatomaceous clay. Next, a predetermined amount of Type II Portland cement, available from Norval Cement A/S, a quick-set type of Portland cement, was rapidly added to the mixture of untreated incinerator residue and diatomaceous clay, and mixing was continued for one minute. A 4.5 kg sample of product was withdrawn from the mixer, and mixing was continued for another minute, after which another 4.5 kg sample was taken. Mixing was once again continued for another minute, and a final 4.5 kg sample was taken. A series of products were made according to an experimented design with three independent variables: percent cement, percent clay and mixing time. Products including 7, 14, and 21 percent by weight of untreated incinerator residue of cement and 0 and 2 percent clay were prepared. Mixing times in the cement mixer were 1, 2, and 3 minutes. The products were allowed to cure for one week.

The product obtained when diatomaceous clay was used was gray, and separated easily into discrete spheres having diameters of 0.953 cm and smaller. Screening and classification tests show that the encapsulating spheres are formed in very small sizes and persisted throughout the mixture.

The average composition of the products was about 1000 g incinerator residue, 140 g Portland cement, and 10 g diatomaceous earth. Density the incinerator residue before treatment is estimated at 1 g/cm³. Density of product is treatment is estimated at 1.6 g/cm³.

After curing, 0.9 kg samples were taken from the mixture for particle size screening and laboratory analyses.

Screen weight distributions were measured for the series of laboratory scale product mixes to estimate the particle size distributions of the products. Eight stainless steel ASTM screens were used to classify product fractions. Mesh sizes were 1, 2, 4, 8, 16, 32, 64, and 128 wires per inch. The screening tests showed that the mean particle diameter was approximately 0.127 cm.

Figure 3:
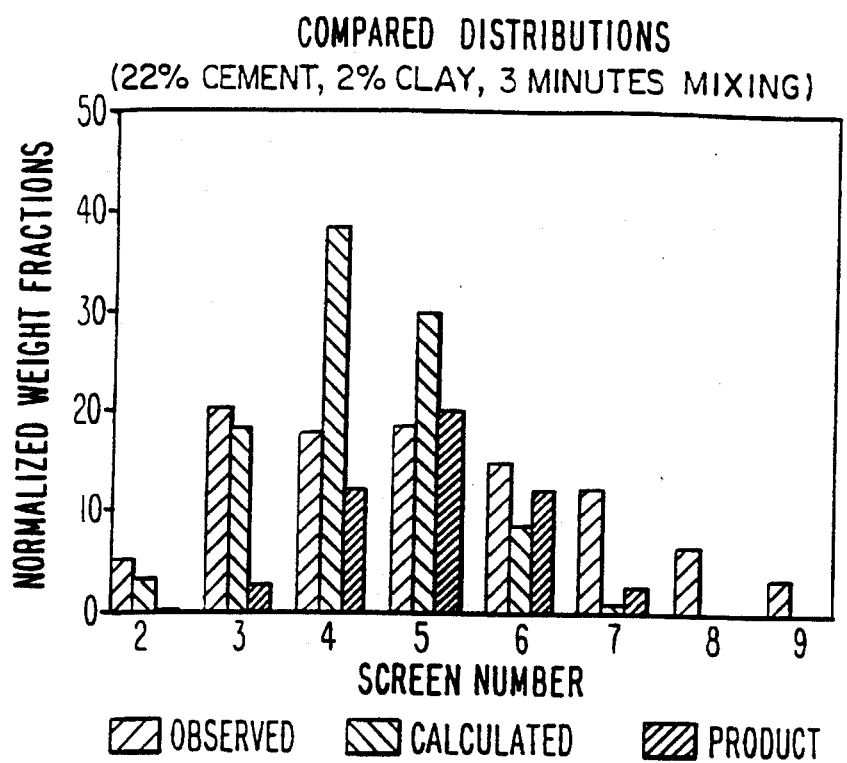
FIG. 3 is a bar graph showing the particle size distribution of product pellets made by one embodiment of the process of the present invention.

An exemplary distribution is shown in FIG. 3. Screen number data on the x axis is the base 2 logarithm of mesh size. Normalized weight fractions are shown on the y axis. CALCULATED estimates the distribution of incinerator residue which can be processed. PRODUCT estimates the distribution of incinerator residue converted to product. Process efficiency is measured as the ratio of the cumulative PRODUCT distribution to the cumulative CALCULATED distribution. This is a practical measure for finding optimal mixes.

In the example shown, process efficiency is about 60 percent. Fines and dust were minimal, and small spheres could be seen in all screen fractions.

A one minute mixing time was found to be preferred over longer times. Product mixed longer than a minute showed some indication that individual pellets were beginning to aggregate into larger pellets, and additional free water was appearing on the surface of the pellets.

Experiments to estimate the effect of the process on the leaching of heavy metals were carried out. Laboratory analyses showed that the leaching of lead and cadmium was 500 to 1,000 times less than that for untreated incinerator residue. Arsenic, barium, chromium, mercury, selenium, and silver showed leaching concentrations from 10 to 50 times less than for untreated incinerator residue.

The product from each trial mixture was analyzed for total heavy metals contained in the untreated residue, and for heavy metals dissolved in an extraction fluid containing acetic acid. The extraction procedure used was the TCLP procedure currently recommended by EPA to estimate leaching of heavy metals from solid waste in landfills. 40 C.F.R. Part 136, § 281.1 (appendix IX). TCLP solution #1 was used for extraction of solids. 32 analyses were performed. Solids and extracts were analyzed for eight RCRA metals using inductively coupled plasma and carbon furnace atomic absorption methods.

In the data that follows, average values of metals in untreated incinerator residue and treated product appear first. Then, data on leaching in acid buffer solutions appears. Columns appear side by side to contrast test results for untreated incinerator residue and product.

TABLE I

|  | Untreated Residue | Screened Product | TCLP EXTRACTS[1] Untreated Residue | Screened Product |
|---|---|---|---|---|
| arsenic | 10.79 | 6.93 | 0.0010 | 0.0019 |
| barium | 125.49 | 103.24 | 0.5513 | 0.2384 |
| cadmium | 3.20 | 1.33 | 0.1855 | 0.0017 |
| chromium | 42.93 | 38.02 | 0.0462 | 0.0277 |
| lead | 504.00 | 280.50 | 0.7000 | 0.0026 |
| mercury | 0.68 | 0.53 | 0.0172 | 0.0027 |
| selenium | 0.25 | 0.65 | 0.0087 | 0.0024 |

TABLE I-continued

|  | Untreated Residue | Screened Product | TCLP EXTRACTS[1] Untreated Residue | Screened Product |
|---|---|---|---|---|
| silver | 1.13 | 0.88 | 0.0023 | 0.0013 |
| pH, final |  |  | 5.11 | 9.44 |
| pH, initial |  |  | 4.27 | 6.02 |

TABLE III

| Independent variable | Coefficient | Std. error | t-value | Sig. level |
|---|---|---|---|---|
| CONSTANT | −1.262777 | 0.785256 | −1.6081 | 0.1243 |
| CLAYPCT | 0.808594 | 0.259696 | 3.1136 | 0.0057 |
| CHEMCT | 0.522489 | 0.121436 | 4.3026 | 0.0004 |
| CEMSQ | −0.016034 | 0.004249 | −3.7733 | 0.0013 |
| CLAYCEM | −0.054682 | 0.017174 | −3.1841 | 0.0049 |

R-SQ (ADJ.) = 0.4863  SE = 0.480863  MAE = 0.365751  DurbWat = 2.150
24 observations fitted.

TABLE IV

| Independent variable | Coefficient | Std. error | t-value | Sig. level |
|---|---|---|---|---|
| CONSTANT | 2.376353 | 0.617386 | 3.8491 | 0.0011 |
| CLAYPCT | 0.116095 | 0.204181 | 0.5686 | 0.5763 |
| CHEMCT | 0.173474 | 0.095477 | 1.8169 | 0.0850 |
| CEMSQ | −0.004542 | 0.003341 | −1.3596 | 0.1899 |
| CLAYCEM | −0.005107 | 0.013502 | −0.3782 | 0.7094 |

R-SQ. (ADJ.) = 0.2490  SE = 0.378070  MAE = 0.246159  DurbWat = 2.072
24 observations fitted.

Figure 4:
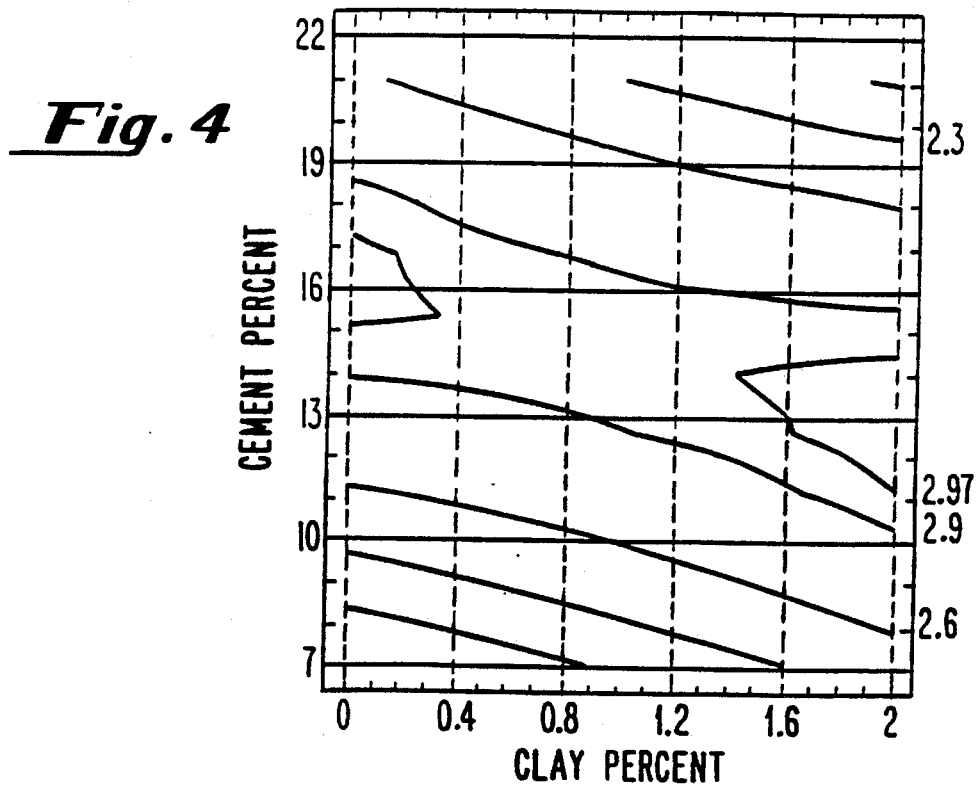
FIG. 4 is a graph illustrating a contour surface for the leaching of cadmium from the product pellets of FIG. 3.
Figure 5:
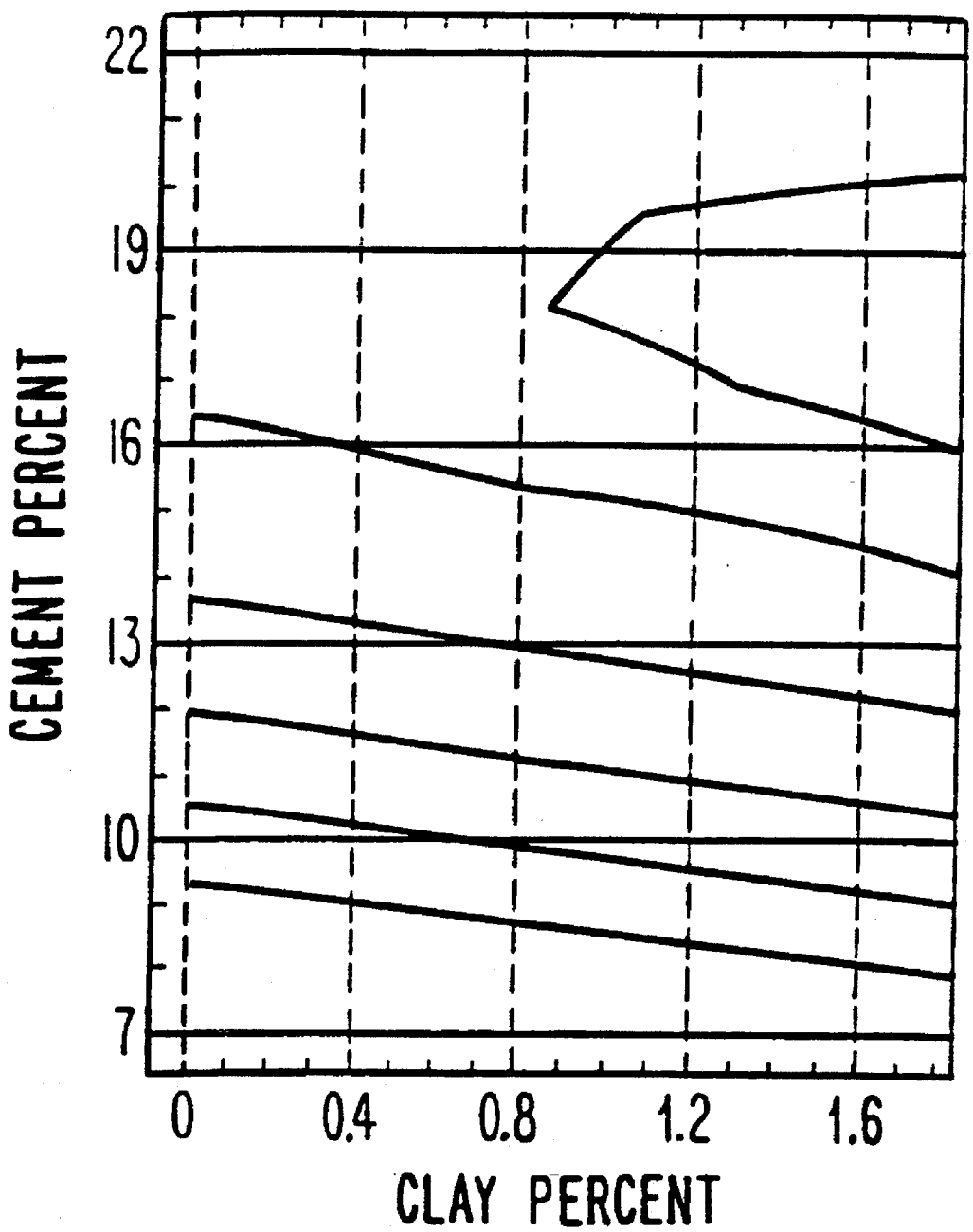
FIG. 5 is a graph illustrating a contour surface for the leaching of lead from product pellets of FIG. 3.

FIG. 3 shows a contour surface for leaching of cadmium from product spheres. FIG. 4 shows a contour surface for leaching of lead from product spheres. Numbers on the contour lines are logs of concentration ratios: "1" means 1/10th of total metals leach into extract solutions. "2" means 1/100th leach. "3" means 1/1000th. The highest number show the regions of best leaching improvement.

EXAMPLE 3

Figure 6:
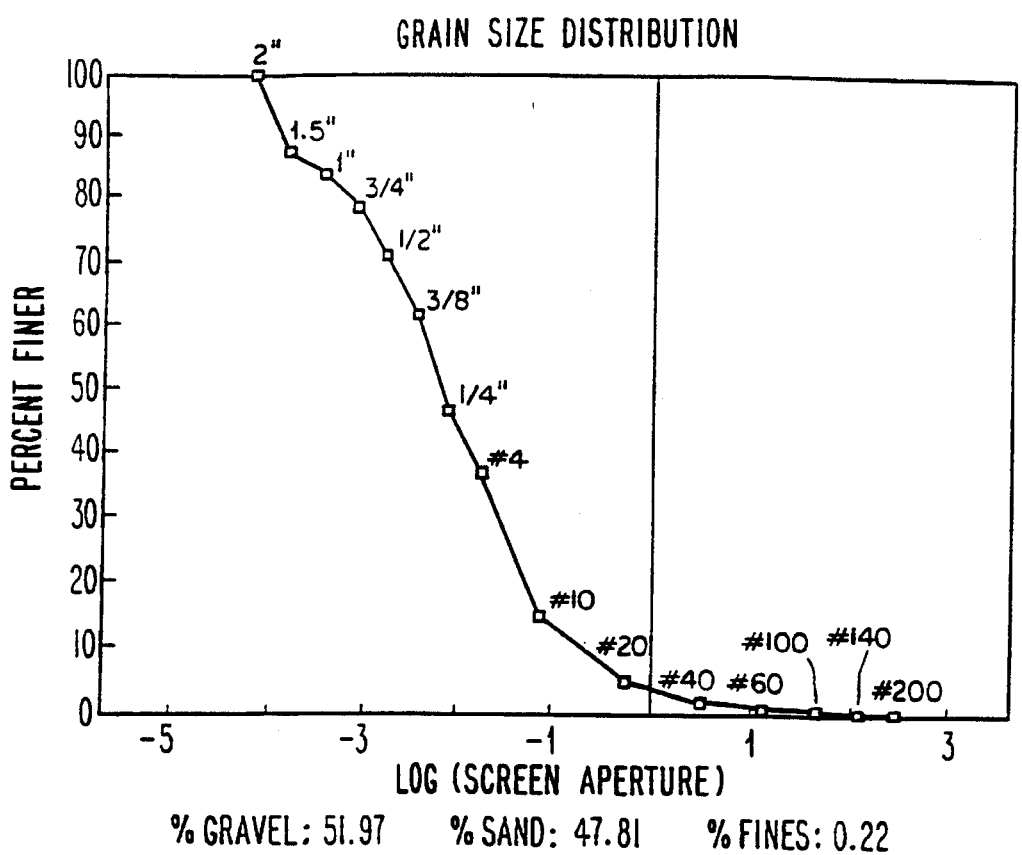
FIG. 6 is a graph illustrating the grain size distribution of a product made using a presently preferred embodiment of the process of this invention.

The process of the present invention was carried out on pilot production scale as follows:

Raw untreated incinerator ash was trucked from a municipal facility incinerating municipal solid waste to a landfill site was weighed and stored in a predetermined location. The untreated incinerator ash was then screened to separate oversize materials (greater than two inches in size) and ferrous materials were removed by magnetic separation. The screening and magnetic separation operations yielded approximately 20 percent by weight oversize and ferrous materials. The undersize untreated incinerator ash was stored in another predefined location, and subsequently trucked to the vicinity of processing facilities at another portion of the landfill and stored in nearby predetermined location. Before beginning processing the undersize untreated incinerator ash, the moisture content of the ash is measured according to ASTM C 566-84, and found to be about 16 percent. Ash is transported by a long walking floor conveyer to a rotary drum processing unit or pelletizer. Water spray devices on the walking floor conveyer deliver about 6 gallons per minute of water to provide a target water to cement ratio of 0.4 w/w. Portland cement is delivered to mix with the wet untreated ash at a rate designed to give a weight percentage of 14 percent. Twenty-four hours after the wet ash is processed, the grain size distribution and moisture content are measured. The moisture content was found to be 7.94 percent and the grain size distribution, shown in FIG. 6, gave 51.97 percent "gravel," 47.81 percent "sand," and 0.25 percent "fines." The processed ash was stored in another predetermined location for use in contructing a gas venting layer for covering the landfill.

EXAMPLE 4

The process of Example 3 was repeated using incinerator ash produced by two different incinerators, and the effect of seasonal wetting/drying periods on the hydraulic conductivity of the product was examined by saturating and air-drying samples. An initial hydraulic conductivity measurement was performed on the material prior to the wetting/drying cycles. Initial and final sieve analyses were also performed to determine the effect of the wetting/drying cycles on the particle size distribution.

Three samples, Samples A1, A2, and A3, produced from incinerator ash obtained from incinerator A, were placed in six-inch acrylic molds at 90 percent maximum index density and initially saturated with de-aired water. A constant head permeability analysis (ASTM D 2434) was performed and the samples were then allowed to drain and air-dry for two days. The samples were weighed after each day of drying. At the end of the drying period, the samples were resaturated. In the first phase of the test, this cycle was repeated twelve times for each sample. At the end of twelve cycles, the samples were tested for hydraulic conductivity and the particle size distribution was measured.

Figure 7:
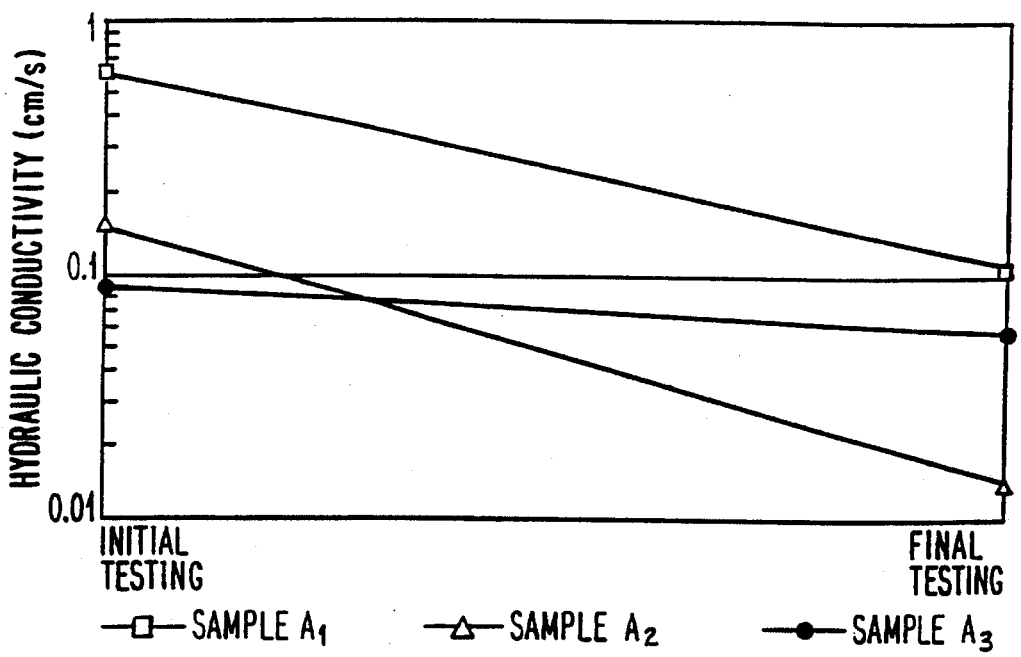
FIG. 7 is a graph showing the effect of wetting/drying cycles on the hydraulic conductivity of product prepared using the process of FIG. 6 from a first lot of incinerator ash.
Figure 8:
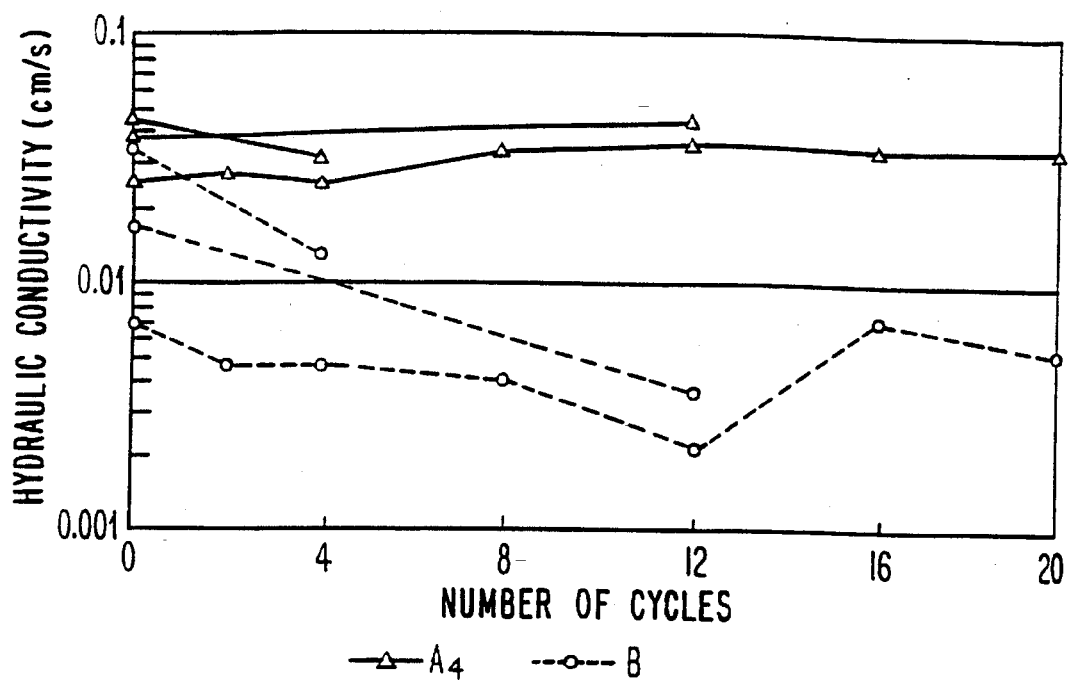
FIG. 8 is a graph showing the effect of wetting/drying cycles on the hydraulic conductivity of product prepared using the process of FIG. 6 from two additional lots of incinerator ash.
Figure 11:
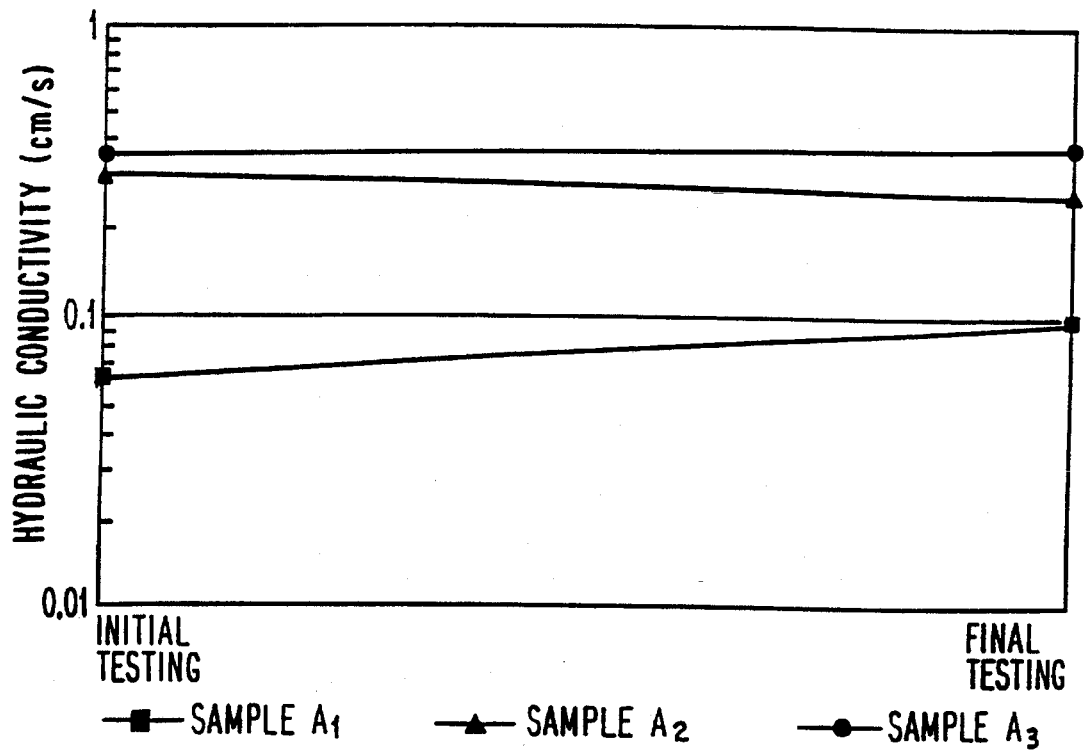
FIG. 11 is a graph showing the effect of freeze/thaw cycling on the hydraulic conductivity of product prepared by the process of FIG. 6.

In a second phase of the test, a sample (Sample A4) was taken from product produced from a second lot of incerator A ash and a sample (Sample B) was taken from ash produced by a second incinerator. In this phase, the wetting/drying cycle was repeated four times for a first mold of each sample, and, on completion of the fourth cycle, a final hydraulic conductivity was measured. The same procedure was repeated with a second mold of each sample, except that twelve wetting/drying cycles were carried out. A third mold of each sample was subjected to twenty cycles of wetting and drying, with the hydraulic conductivity being measured after cycles 2, 4, 8, 12, 16, and 20. After the final hydraulic conductivity measurement at twenty cycles, the samples were removed from the molds and a final sieve analysis was performed. The results of the wetting/drying cycles on the grain size distribution are summarized in Table V for samples A1–A3 and two additional samples A5, A6 from the same source, and the effect on hydraulic conductivity is illustrated in FIGS. 7 and 8.

TABLE V

| Sample | % Gravel | % Sand | % Fines | Class. (USCS) |
| --- | --- | --- | --- | --- |
| A1 | 49.1 | 48.5 | 2.4 | GW |
| A2 | 64.5 | 34.7 | 0.8 | GW |
| A3 | 73.8 | 21.8 | 4.4 | GW |
| A5 | 67.1 | 27.8 | 5.1 | GW–GM |
| A6 | 74.5 | 23.6 | 1.9 | GW |
| A4: | | | | |
| Initial | 33.9 | 62.3 | 3.8 | SP |
| 4 cycles | 35.4 | 60.7 | 3.9 | SP |
| 12 cycles | 32.6 | 63.9 | 3.5 | SP |
| 20 cycles | 28.1 | 66.4 | 5.5 | SW–SP |
| B: | | | | |

TABLE V-continued

| Sample | % Gravel | % Sand | % Fines | Class. (USCS) |
| --- | --- | --- | --- | --- |
| Initial | 41.0 | 56.3 | 2.7 | SW |
| 4 cycles | 34.8 | 60.3 | 4.9 | SW |
| 12 cycles | 33.8 | 62.4 | 3.8 | SP |
| 20 cycles | 30.0 | 65.4 | 4.6 | SW |

Figure 9:
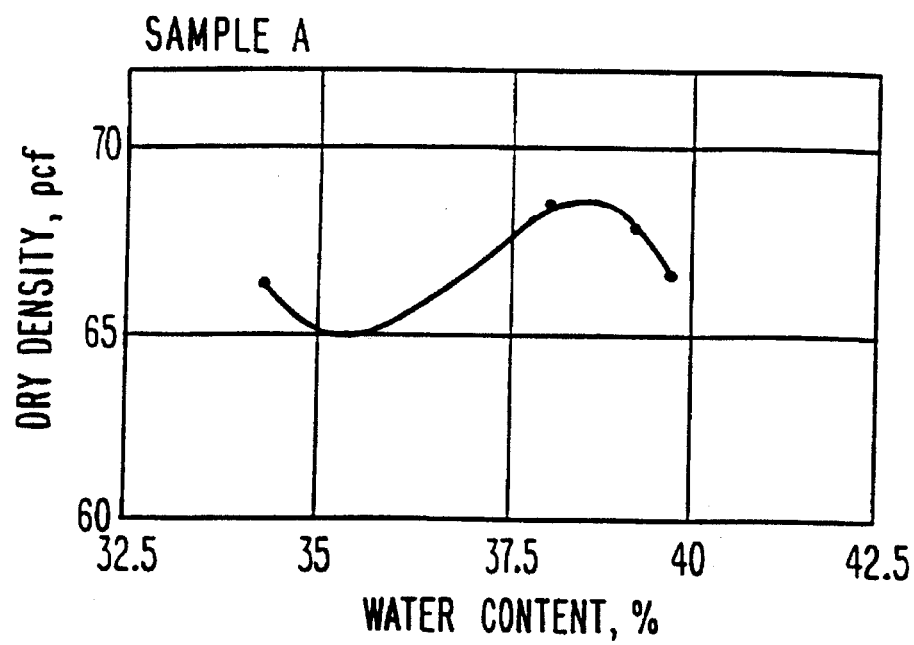
FIG. 9 is a graph showing density as a function of water content for product prepared according to the present process from a one lot of incinerator ash.
Figure 10:
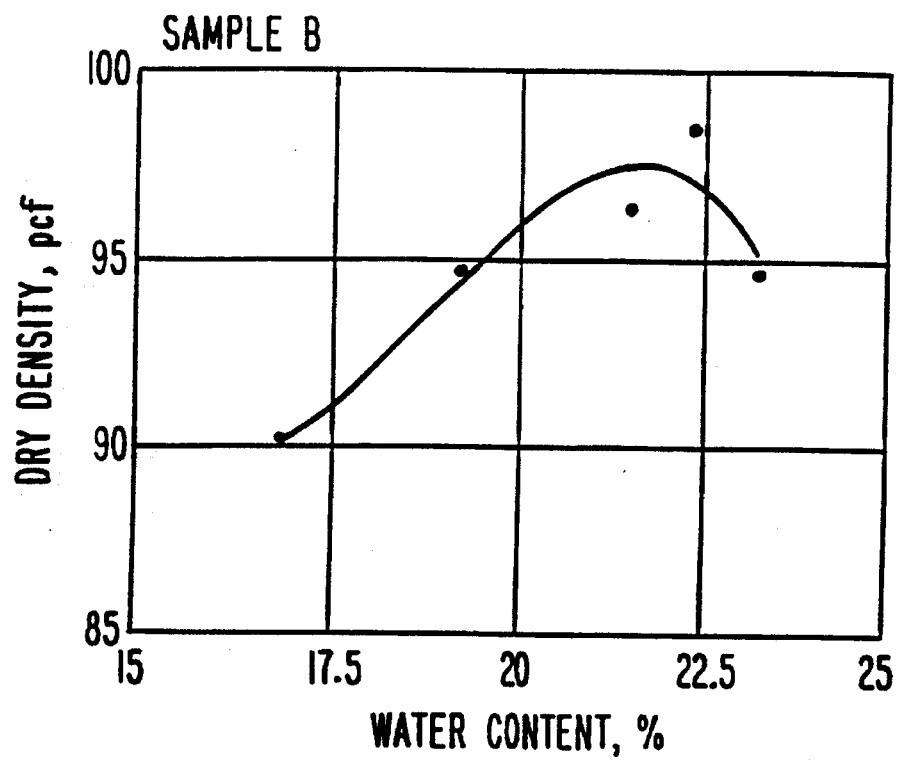
FIG. 10 is a graph showing density as a function of water content for product prepared according to the present process from another lot of incinerator ash.

Moisture-density relationships for Samples A4 and B were determined using ASTM D 698 and the results are shown in FIGS. 9 and 10.

It was found that the intitial samples of ash obtained from incinerator A (A1–A3) were coarser (grade GW) than the sample (A4) obtained from the second lot (SW). The sample from incinerator B was also graded SW. Physical examination of the samples showed that the first lot of ash from incinerator A contained more unburned refuse and metal (in particular, sample A1) than the second lot, suggesting that the lot was the result of incomplete incineration. The data in FIG. 7 show that when subjected to twelve successive wetting/drying cycles, the hydraulic conductivity remained constant for sample A3, while the hydraulic conductivities of samples A1 and A2 decreased by about an order of magnitude. The grain size distribution curves also showed a slight decrease in particle size for these samples.

In contrast the data in FIG. 8 show that sample A4, produced from the second lot of ash from incinerator A, had a hydraulic conductivity which did not exhibit any significant trend when subjected to successive wetting/drying cycles. This was also reflected in the grain size distribution curves.

The material produced using the ash from incinerator B showed somewhat different behavior. As can be seen in FIG. 8, sample B showed a downward trend in hyraulic conductivity up to cycle 12; after cycle 12 the hydraulic conductivity increased. The sample B material was found to be increasingly difficult to remove from the molds. After 20 cycles, the sample B material broke into clumps on removal from the molds which then fell apart as they were run through the seive analysis. The clumps could be distinguished in the grain size distribution curves after 12 cycles. The formation of clumps indicates that the sample B material included unreacted cement. During processing of the ash, it is believed that the surface moisture or free water available for reaction with the added Portland cement was most likely too low. The cement was then unable to fully react with the ash to form a stable matrix. When the sample B material was subjected to repeated wetting/drying cycles, the unreacted cement then began to harden into the observed clumps.

The moisture-density data shown in FIGS. 9 and 10 indicate that the sample B ash is more dense than the sample A ash, suggesting that the sample B ash requires more water application before processing. This is consistent with the observed clumping of the sample B product.

These results show the importance of fully incinerating the ash to be processed, and of providing adequate free water before mixing the ash and the Portland cement to make the product.

EXAMPLE 5

The freeze/thaw properties of samples A1–A3 of Example 4 were examined. One six-inch acrylic mold was filled with subsamples of each of samples A1, A2 and A3, to within 90 percent of the maximum index density. An initial hydraulic conductivity measurement was made on each sample, and the samples were allowed to drain freely so that they did not contain any standing water, after which the samples were wrapped to prevent further drying. The molds were placed in open-topped insulated boxes, and the intersitial spaces between the molds and boxes were filled with the sample ash material. The insulated boxes were designed to assure that the samples would freeze from top downward in order to simulate landfill conditions. The molds were placed in a freezer along with a control mold (prepared in the same manner as the three sample molds) containing a thermometer to verify freezing. As soon as the temperature of the molds reached freezing (32° F.) or less, the molds were removed from the freezer and allowed to thaw. This cycle was repeated twelve times, and at the end of the twelve cycles, the hydraulic conductivity and the grain size distribution were measured. No significant effect on either property was observed for any of the samples.

EXAMPLE 6

The hydraulic conductivity of product prepared according to Example 3 was evaluated as a function of the degree of compaction of the material. It is believed that reaction of the cement coating of fresh product prepared according to the present process result in adhesion of the product over time. Adhesive forces are reflected in increases in the compressive strength of the material over time. Adhesion of the product particles results in a stable matrix structure for compacted fresh product.

For a field test, a 30 foot by 10 foot pad of product cured between 18 and 24 hours was placed over an incinerator ash monofill base using a payloader and graded and leveled by hand. The pad was then wet down and compacted using a 2500 pound roller. The pad was divided into three 10 foot by 10 foot sections, each subjected to a different degree of compaction. The pad was constructed of three successive 6 inch lifts before compaction. Each section was subdivided into twenty-five, 2 foot by 2 foot sections for testing purposes after the third lift was compacted. Section one, with maximum compaction, had eight roller passes. Section two, medium compaction, had four roller passes. Section, three, minimum compaction, had two roller passes. Each section was wet down so that the material was continuously moist. The water allowed the unreacted cement to bond and form a stable matrix.

Compressive strength after compaction was measured using a cone pentrometer consisting of a cylindrical steel rod driven by a rammer. The steel rod was one inch in diameter by five feet long with one end of the rod tapered to a sixty degree point. Rammer weights were selected so that five drops from a three foot height drove the rod approximately four inches into the pad.

Compressive strength after compaction was measured at daily intervals for eight consecutive days. Two subsections per section were tested each day. Initially, ten tests per subsection were performed and tha average penetration depth was calculated with the two extreme values disregarded. After four days, the number of test per subsection was reduced to five, as an artifactual reduction in shear strength was observed after five tests in the initial series.

Hydraulic conductivity was measured after compaction each day on each section of the pad. Falling head infiltration rates were measured using a transparent graduated cylinder grouted into the test pad and filled with water. The cylinder was 1.9 inches in diameter, and grouted between 5 inches and 6 inches deep into the pad. Putty was used as the grout, and prevented upward flow that may be caused by a static head as well as providing structural support. Hydraulic conductivity was calculated by timing the rate for the water to drop twelve inches and then calculating head loss and volumetric factors.

Bulk density tests were performed before and after compaction using a sand density cone apparatus to measure compactive stress. Three test were performed before compaction and averaged, and three tests per section were performed after compaction.

Seive analysis test were performed before and after compaction using the material removed for holes made by the bulk density tests. Three tests were performed before compaction, and three tests per section were performed after compaction.

Figure 12:
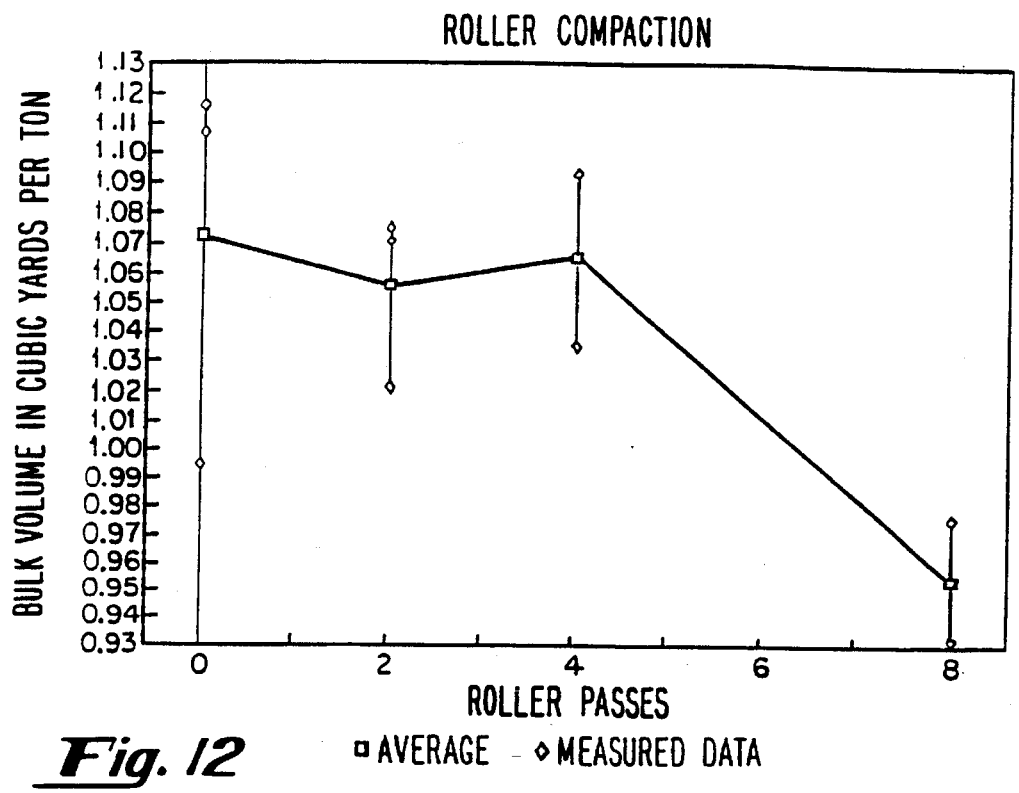
FIG. 12 is a graph showing the effect of roller compaction on the bulk volume of product prepared according to the presently preferred process of this invention.
Figure 13:
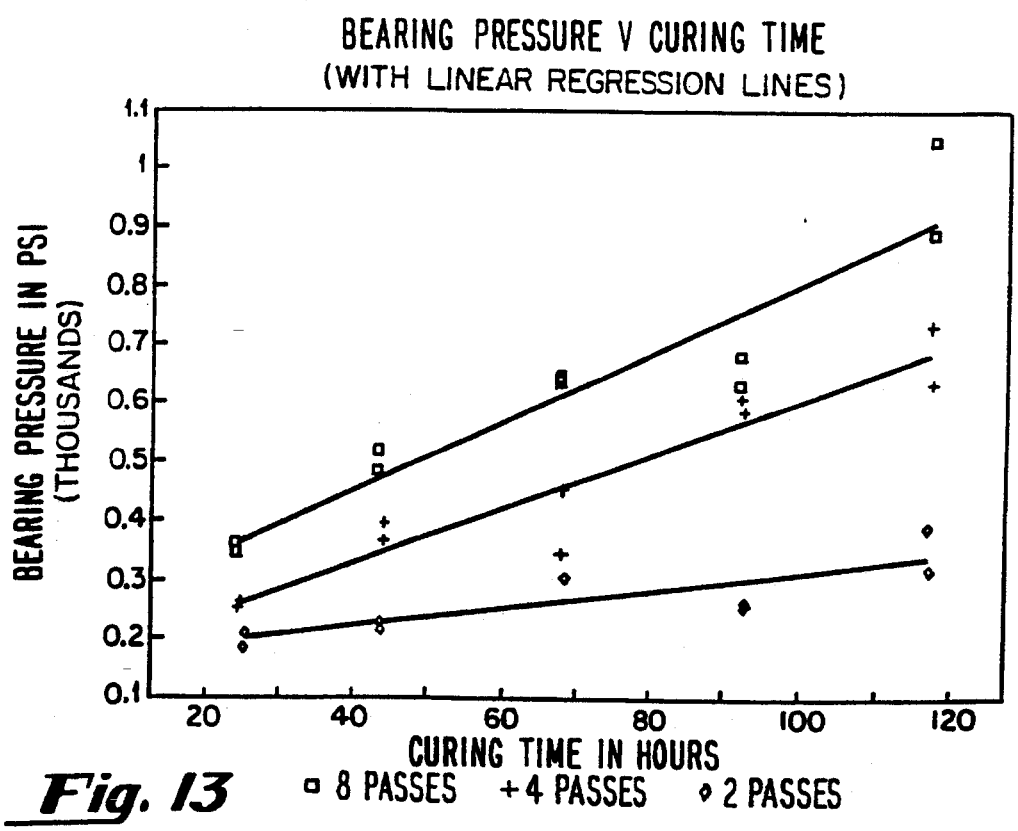
FIG. 13 is a graph showing the bearing pressure of a pad formed from the product of FIG. 12 as functions of cure time and compaction.
Figure 14:
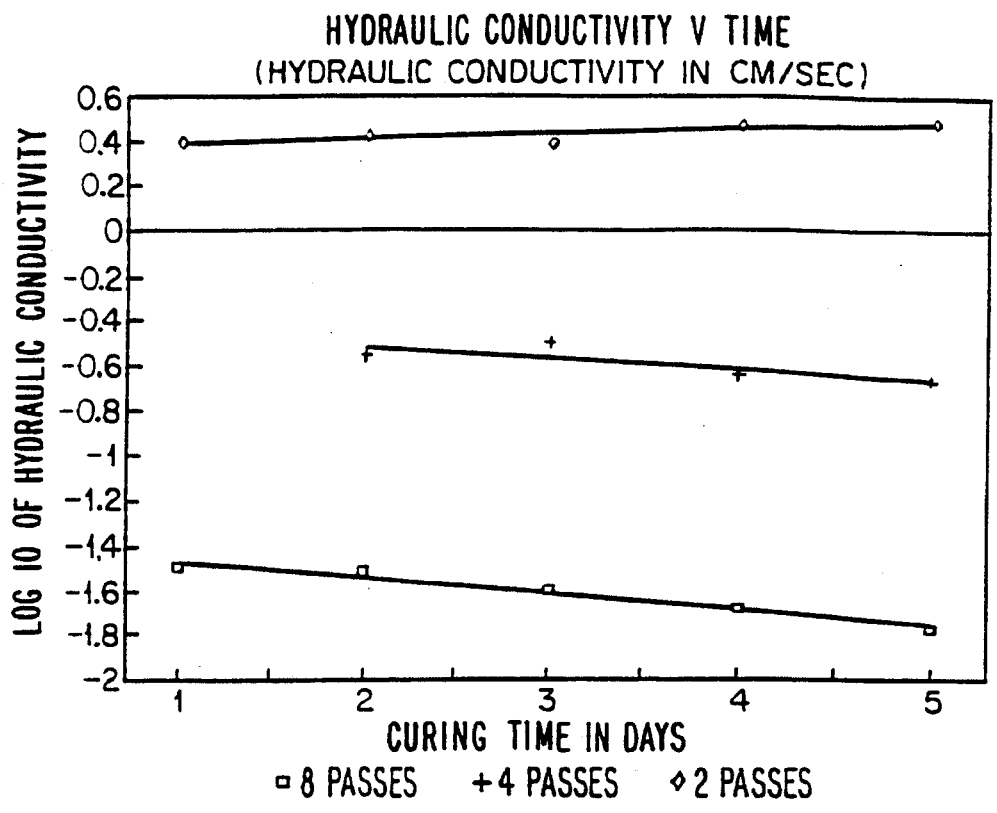
FIG. 14 is a graph showing hydraulic conductivity as functions of cure time and compaction for the product of FIG. 12.
Figure 15:
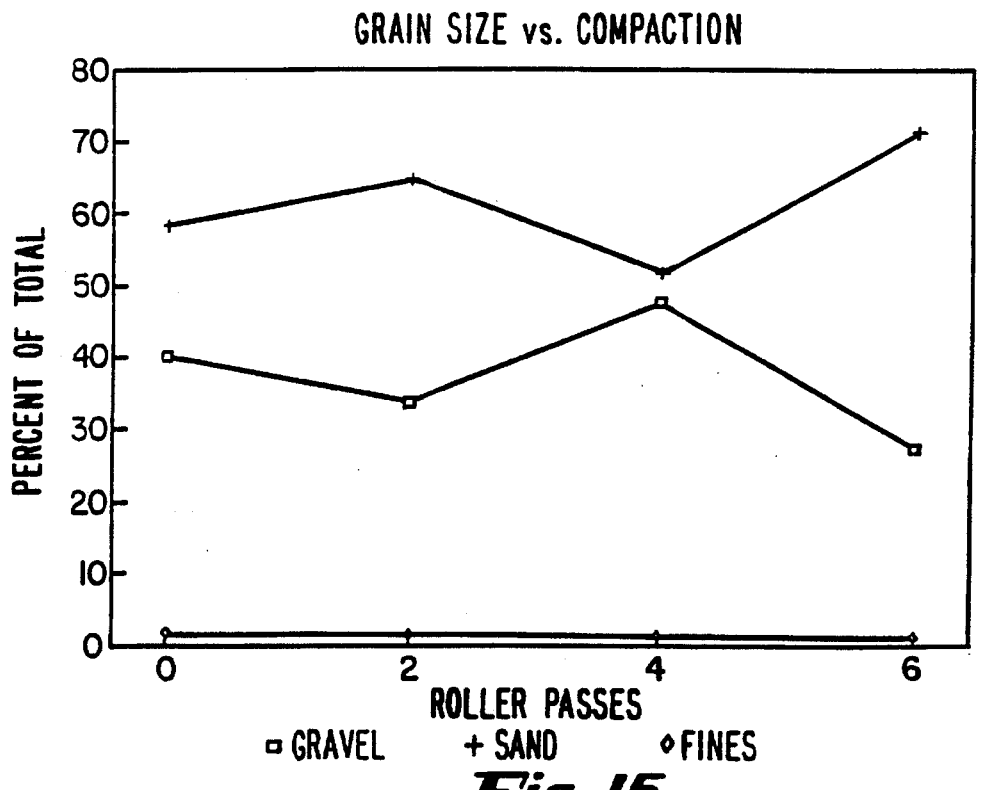
FIG. 15 is a graph showing grain size as a function of compaction for a product of the presently preferred embodiment.

The results of the bulk density tests are shown in FIG. 12 show that the bulk volume had no significant change after four roller passes but decreased after that. The bearing strength (FIG. 13) showed a significant increase over time for all three sections of the pad. However, the hydraulic conductivity (FIG. 14) and the grain sizes (FIG. 15) showed no significant change over time. No noticable change in particle size was observed after compaction, suggesting that while compaction reduced the free volume after four passes, compaction did not significantly crush the product particles, as determined by review of the grain size distribution curves and the hydraulic conductivity.

EXAMPLE 7

The process of Example 3 was repeated and a sample was cured under ambient conditions. Leaching of various materials from the product was then measured under unsaturated (that is, non-equilibrium) conditions using a column of product pursuant to (test procedure) as a function of cure period, lift height, liquid-to-solid ratio, and application rate. Table VI and Table VI B summarize the results tion rate. Table VI and Table VI B summarize the results obtained for a sample cured seven days, employing a lift height of 2.5 ft., and an application rate of 0.22 l/min.-sf A.R., as a function of the weight ratio of the total liquid applied to the solid material. The applied liquid had a pH of 6.5, adjusted using hydrochloric acid and nitric acid, to simulate acid rain in the Long Island, N.Y., area. The results are compared with New York State standards for groundwater discharge, and compare favorably with results expected for untreated incinerator ash. In particular, these results show a significant reduction in leaching of calcium and sulfate, while the leaching salts including monovalent ions such as sodium and chloride are comparable to that expected for untreated ash.

TABLE VI A

| Liquid/solid[1] (l/kg) | 0.132 | 0.265 | 0.397 | 0.529 |
|---|---|---|---|---|
| pH (S.U.)[2] | 11.5 | 11.8 | 11.5 | 11.7 |
| spec. cond.[3] (mS/M) | 763 | 930 | 910 | 777 |
| TDS (mg/l)[4] | 4,460 | 5,312 | 5,912 | 4,556 |
| $SO_4$ (mg/l)[5] | | | 37.3 | |
| S (mg/l)[6] | | | 27.84 | |
| Cl (mg/l)[7] | 2,137 | 2,549 | 2,349 | 1,725 |
| $NO_3$—N (mg/l)[8] | | | 0.78 | |
| K (mg/l) | 512 | 605 | 585 | 461 |
| Ca (mg/l) | 600 | 719 | 537 | 527 |

TABLE VI A-continued

| | | | | |
|---|---|---|---|---|
| Na (mg/l) | 510 | 585 | 564 | 433 |
| Mg (mg/l) | | | 0.05 | |
| Fe (mg/l)[9] | | | 0.05 | |
| Mn (mg/l)[9] | | | 0.03 | |
| Pb (mg/l)[10] | 0.12 | 0.15 | 0.14 | 0.13 |
| Cd (mg/l)[11] | 0.02 | 0.02 | 0.02 | 0.02 |

TABLE VI B

| | | | | | |
|---|---|---|---|---|---|
| Liquid/solid[1] (l/kg) | 0.66 | 0.99 | 1.32 | 2.65 | 3.97 |
| pH (S.U.)[2] | 11.4 | 11.0 | 10.9 | 10.3 | 11.4 |
| spec. cond.[3] (mS/M) | 644 | 530 | 500 | 232 | 230 |
| TDS (mg/l)[4] | 3,753 | 2,832 | 2,588 | 1,168 | 1,076 |
| $SO_4$ (mg/l)[5] | | 32.6 | | | 10.2 |
| S (mg/l)[6] | | 30.72 | | | 7.12 |
| Cl (mg/l)[7] | 1,362 | 1,000 | 900 | 375 | 350 |
| $NO_3$—N (mg/l)[8] | | 1.22 | | | 0.34 |
| K (mg/l) | 391 | 301 | 271 | 98 | 87 |
| Ca (mg/l) | 518 | 442 | 381 | 210 | 169 |
| Na (mg/l) | 365 | 287 | 259 | 95 | 87 |
| Mg (mg/l) | | 0.04 | | | 0.03 |
| Fe (mg/l)[9] | 0.05 | 0.05 | | | 0.05 |
| Mn (mg/l)[9] | | 0.03 | | | 0.03 |
| Pb (mg/l)[10] | 0.09 | 0.08 | 0.08 | 0.08 | 0.05 |
| Cd (mg/l)[11] | 0.02 | 0.02 | 0.02 | 0.02 | 0.02 |

[1] The liquid was simulated acid rain having a pH of 6.5, prepared from deionized rainwater through addition of hydrochloric and nitric acids, and applied by a sprinkler system to even distribute the liquid.
[2] The pH was measured using a glass electrode and a standard pH meter. The ground water discharge standard under 6 NYCRR 703.6 is pH = 6.5–8.5 (Method 9045, SW-846).
[3] The specific conductance was measured using a conductivity meter.
[4] Total dissolved solids were measured using 350.2, Methods for Examination of Water and Waste Water. The ground water discharge standard under 6 NYCRR 703.6 is 1,000 mg/l.
[5] The ground water discharge standard under 6 NYCRR 703.6 is 500 mg/l.
[6] The ground water discharge standard under 6 NYCRR 703.6 is 1.0 mg/l.
[7] The ground water discharge standard under 6 NYCRR 703.6 is 500 mg/l.
[8] The ground water discharge standard under 6 NYCRR 703.6 is 20 mg/l.
[9] The ground water discharge standard under 6 NYCRR 703.6 is that the combined concentration of iron and maganese shall not exceed 1.0 mg/l.
[10] The ground water discharge standard under 6 NYCRR 703.6 is 0.05 mg/l.
[11] The ground water discharge standard under 6 NYCRR 703.6 is 0.02 mg/l.

EXAMPLE 8

The process of Example 3 was repeated and a sample was cured under ambient conditions. Leaching of various materials from the product was then measured under both unsaturated and saturated conditions for a series of grain size fractions, and for unfractionated material.

Under saturated leaching conditions, mean total dissolved solids ("TDS") concentrations of fractionated product equal observed TDS concentrations of unfractionated product. However, under unsaturated leaching conditions, mean TDS concentrations are 3 to 4 times higher than observed TDS concentrations.

In order to determine the difference between unsaturated and saturated leaching as a function of surface area, column leaching tests were performed on the gravel, coarse sand, and fine sand fractions of product prepared as in Example 3.

For the unsaturated test, 1000 grams of unfractionated product was used as a control sample. Samples of gravel, coarse sand, and fine sand fractions of product prepared according to the process of this invention were prepared by screening. 1000 grams of each fraction were prepared. Duplicate samples were prepared for the unfractionated material and each fraction. The unfractionated material sample was obtained by reducing a sampled stockpile to testing size by ASTM method C702. Grain size fractions were collected by sieve analysis. The gravel fraction consisted of that unfractionated material passing a 3 in. sieve and retained on a ¼ in. sieve. The coarse sand fraction consisted of that unfractionated material passing a ¼ in. sieve and retained on a no. 20 sive. The fine sand fraction consisted of everything passing a no. 20 sieve.

Each 100 gram sample was then placed in a compaction permeameter mold. The samples were leveled and a porous stone plate was placed on top. 1 liter of distilled water was then poured into the mold and collected at the discharge outlet. pH and TDS were then measured.

For saturated leaching tests, 500 grams of unfractionated was used as a sample. Gravel, coarse sand, and fine sand fractions of the unfractionated material were prepared by screening. Duplicate fractions were prepared and tested.

The samples were then placed in a 1 liter graduated cylinder filled with 500 ml of water. Samples were allowed to saturate for 30 minutes. After saturation, the water was collected by running the sample through a fine screen. pH and TDS were then measured.

For both the unsaturated and saturated tests, grain size analysis was performed on the individual grain size fractions. Percent moisture was measured on grain size fractions. The procedure used for the tests and the methods employed are as follows:

The unsaturated leaching test was performed as follows. The stockpile of product was sampled by extracting a 5 gallon bucket of material pursuant to ASTM D 75, and this was divided into representative subsamples pursuant to ASTM C 702. The particle size distribution test was then performed according to ASTM D 422. Two 1 kg samples were collected from the representative subsamples, and two 1 kg samples of gravel, coarse sand, and fine sand respectively by shaking unfractionated material through sieves. The following sieve sizes were used for the grain size fractions.

| fraction | sieve sizes |
| --- | --- |
| gravel | 3 in.–.25 in. |
| coarse sand | No. 4–No. 20 |
| fine sand | No. 40–No. 200 |

The percent moisture for each grain size fraction and the unfractionated material were then determined according to ASTM C 566. Each fraction and the unfractionated sample were placed separately into the permeameter device for each test, and 1 liter of distilled water was leached through the permeameter and collected at discharge outlet in 1 liter sample bottle. TDS and pH were measured before and after leaching.

The saturated leaching test was performed as follows: The stockpile was sampled and divided into representative subsamples and the particle size distributions was measured as in the unsaturated leaching test. Then two 0.5 kg samples were collected from the representative subsamples, and two 0.5 kg samples of gravel, coarse sand, and fine sand respectively were collected by shaking through sieves as in the case of the unsaturated leaching test, and percent moisture for each grain size fraction and the unfactionated material were determined. For each sample, 500 ml of distilled water was poured into a 1 liter graduated cylinder. Each fraction and the composite sample were placed in a respective cylinder, and the samples were allowed to saturate for 30 minutes. TDS and pH were measured before and after leaching.

The results of the measuring the fraction weights and the specific gravities are given in Table VII.

TABLE VII

|  | Unsaturated conditions | Saturated conditions | specific gravity g/cm3 |
| --- | --- | --- | --- |
| unfractionated | 548.0 g | 600.6 g | 1.721 |
| gravel | 115.9 | 178.4 | 1.948 |
| coarse sand | 301.6 | 296.6 | 1.712 |
| fine sand | 130.5 | 125.6 | 1.462 |

As grain size decreases, the surface area increases. Table VIII shows calculated surface areas and mean particle volumes for test fractions.

TABLE VIII

| Standard screen | Particle diameter | Surface area[1] | | Volume[2] | |
| --- | --- | --- | --- | --- | --- |
|  |  | Unsat. | Satur. | Unsat. | Satur. |
| Gravel fraction |  |  |  |  |  |
| 2 in | 62 mm | 0 | 0 | 0 | 0 |
| 1½ in | 44 | 0 | 0 | 0 | 0 |
| 1 in | 31 | 0 | 0 | 0 | 0 |
| ¾ in | 22 | 17 | 10 | 6 | 4 |
| ½ in | 16 | 41 | 107 | 11 | 28 |
| ⅜ in | 11 | 57 | 151 | 10 | 28 |
| ¼ in | 8 | 247 | 249 | 32 | 32 |
| Coarse sand fraction |  |  |  |  |  |
| No. 4 | 5.4920 | 281 | 316 | 26 | 29 |
| No. 10 | 3.0822 | 1594 | 1600 | 82 | 82 |
| No. 20 | 1.3038 | 3153 | 2860 | 69 | 62 |
| Fine sand fraction |  |  |  |  |  |
| No. 40 | 0.6010 | 4268 | 3859 | 43 | 39 |
| No. 60 | 0.3260 | 3665 | 3413 | 20 | 19 |
| No. 100 | 0.1936 | 3561 | 3498 | 11 | 11 |
| No. 140 | 0.1261 | 2669 | 2897 | 6 | 6 |
| No. 200 | 0.0892 | 2670 | 3177 | 4 | 5 |
| bottom | 0.0530 | 6269 | 7508 | 6 | 7 |

[1] Surface area in $cm^2/kg$.
[2] Volume in $cm^3/kg$.

The leaching test results are given in Table IX. For unsaturated leaching, the pH increased slightly as particle size decreased. TDS concentration increased significantly. The average TDS concentration for the fine sand fraction was several times the gravel and coarse sand grain size fractions.

TDS measurments showed a large variance for the unfractionated, coarse sand, and fine sand fractions. The large variance is probably due to sample size and channeling. There was probably little variance in the gravel fraction because of its high hydraulic conductivity.

The second fine sand sample was disregarded and retested because the material was dry after the first trial. Probably, the water leached down the inside perimeter of the mold rather than through the sample. The sample was retested without a porous stone plate and water was distributed uniformly throughout the sample. TDS concentration increased.

For saturated leaching, the pH and TDS concentration also increased as the particle size decreased. The TDS concentration for the fine sand fraction was approximately 2.5 times that of the gravel fraction. The TDS concentration for the fine sand fraction was approximately 1.25 times that of the coarse sand fraction.

Saturated TDS measurements also showed a large variance but less than that for the unsaturated measurements. The large variance is probably due to small sample size. pH was higher under saturated conditions. TDS concentration of fractions was higher under saturated conditions, except the fine sand fraction. TDS concentration of the fine sand fraction was higher under unsaturated conditions. The unfractionated sample leached nearly six times as much under saturated leaching conditions.

TABLE IX

| | sample wet wt.[1] | bulk volume[2] | % moist. | dry density[3] | pH | Leachate TDS[4] | aver. TDS[5] |
|---|---|---|---|---|---|---|---|
| Unsaturated conditions | | | | | | | |
| unfract. | 1000 | 750 | 0.159 | 1.121 | 10.70 | 482 | 775 |
| | 1000 | 740 | 0.159 | 1.136 | 10.91 | 1068 | |
| gravel | 1000 | 882 | 0.103 | 1.017 | 10.09 | 366 | 337 |
| | 1000 | 855 | 0.103 | 1.049 | 9.89 | 308 | |
| coarse sand | 1000 | 810 | 0.158 | 1.040 | 10.89 | 1623 | 1078 |
| | 1000 | 810 | 0.158 | 1.040 | 10.76 | 533 | |
| fine sand | 1000 | 980 | 0.222 | 0.794 | 11.41 | 9860 | 8639 |
| | 1000 | 1020 | 0.222 | 0.763 | 11.59 | 1487 | |
| | 1000 | 1020 | 0.222 | 0.763 | 11.23 | 5930 | |
| Saturated conditions | | | | | | | |
| unfract. | 500 | 360 | 0.162 | 1.164 | 11.65 | 3670 | 4460 |
| | 500 | 360 | 0.162 | 1.164 | 11.79 | 5250 | |
| gravel | 500 | 430 | 0.081 | 1.069 | 11.41 | 2390 | 2390 |
| | 500 | 430 | 0.081 | 1.069 | 11.42 | NA | |
| coarse sand | 500 | 400 | 0.157 | 1.054 | 11.62 | 5590 | 4980 |
| | 500 | 400 | 0.157 | 1.041 | 11.75 | 4370 | |
| fine sand | 500 | 520 | 0.222 | 0.748 | 11.83 | 6340 | 6290 |
| | 500 | 530 | 0.222 | 0.734 | 12.13 | 6240 | |

[1] Sample wet weight in grams.
[2] Bulk volume in $cm^3$.
[3] Dry density in $g/cm^3$.
[4] Total dissolved solids in mg/l.
[5] Average total dissolved solids.

These results show that unsaturated leaching characteristics are a function of surface area. As particle size decreases, the number of particles on each sieve increases. Total surface area increases. TDS concentration increases with surface area, at an increasing rate. During unsaturated leaching, the water is believed to flow through the voids of the material and not through the material itself. As a result, the water permeates only the surface. During unsaturated leaching of the unfractionated product, because of high hydraulic conductivily, the water is believed to permeate only the cement coating of each particle.

The finer the particle size, the lower the hydraulic conductivity and void ratio. As the hydraulic conductivity and void ratio decreases, percent saturation increases. Leaching conditions then become closer to saturated conditions. TDS concentration was similar for the unsaturated and saturated fine sand (Table IX).

The finer the particle size, the lower the thickness of the cement coating surrounding each particle. As a result, leachate can permeate the cement coating and the ash itself at a faster rate than for coarser particles.

Under saturated conditions leaching from unfractionated product is seen as a function of particle sizes. Coarser particles leach less than fine particles.

Leaching under unsaturated conditions is shown to be less than under saturated conditions. Unfractionated product samples differed by nearly six times in magnitude for TDS. Gravel and coarse sand fractions also leached less under unsaturated conditions. Fine sand fractions were similar because of lower hydraulic conductivity and void ratio. pH was lower in the unsaturated tests. Saturated test results showed less variance than unsaturated test results.

Weight fractions and mean TDS results are shown in Table X. Mean TDS was estimated by summing weight fraction times TDS concentration. Calculated mean TDS concentrations for size fractions nearly equal the observed TDS concentration of the unfractionated product sample.

Under unsaturated flow conditions, calculated mean TDS concentrations were 3 to 4 times higher than observed TDS concentrations. Materials with high hydraulic conductivity are susceptible to channeling. Channeling effectively lowers leaching from coarse sand and fine sand fractions.

TABLE X

| | Surface Area[1] | | Volume[2] | | TDS[3] | |
|---|---|---|---|---|---|---|
| | Unsat. | Satur. | Unsat. | Satur. | Unsat. | Sat. |
| Unfract. | 28493 | 29644 | 325 | 351 | 775 | 4460 |
| Gravel | 362 | 518 | 59 | 92 | 337 | 2390 |
| Coarse sand | 5028 | 4775 | 176 | 173 | 1078 | 4980 |
| Fine sand | 23103 | 24351 | 89 | 86 | 8639 | 6290 |

[1] Suraface area in $cm^2/kg$.
[2] Volume in $cm^3/kg$.
[3] Total dissolved solids in g/g.

TABLE XI

| | Unsaturated conditions | | Saturated conditions | |
|---|---|---|---|---|
| | Weight fraction | TDS g/g | Weight fraction | TDS g/g |
| Unfract. | 1.000 | 775 | 1.000 | 4460 |
| Gravel | 0.211 | 71 | 0.297 | 710 |
| Coarse sand | 0.550 | 593 | 0.494 | 2459 |
| Fine sand | 0.238 | 2057 | 0.209 | 1315 |
| Calculated TDS: | | 2722 | | 4485 |
| Calc TDS/obs TDS: | | 3.152 | | 1.006 |

EXAMPLE 9

The process of Example 3 was repeated and a sample was cured under ambient conditions. Leaching of various materials from the product was then measured under essentially saturated conditions on a large scale. A concrete-walled cylinder about ten feet in diameter and six feet high was filled with product, and a similar cylindar was filled with untreated ash. Water was sprayed at a rate of about 8 gallons per minute on the tops of the materials in the cylinders until the material appeared saturated, and the spraying was then stopped and the applied water was permitted to drain out of the bottom of the cylinder for a period. Thus, water was intermittently sprayed on the materials until the weight ratios of sprayed water to ash or product was calculated to be five to one. Intermittently, samples of leachate were taken for elemental analysis. At the end of the experiment, fine particle size samples of the ash and product were taken (passing No. 35 mesh screen), and the actual weight ratio of leachate to material were measured. Elemental analyses of the product and the untreated ash control are reported in Table XII. Elemental analyses of the leachate from the product and the control are reported in Table XIII. The data show that differences between the product of the present invention and the untreated ash are salt-specific. For example, sodium chloride leaches more quickly from the product that from the untreated ash. However, while sulfate salts leaches from the untreated ash, little sulfate leaches from the product.

TABLE XII

| | Product[1] | | | Untreated Ash[1] | | |
|---|---|---|---|---|---|---|
| Element | Before Leaching | After Leaching | Difference | Before Leach. | After Leach. | Difference |
| LOI[2] | 177[3] | 104 | 73 | 130 | 96 | 33 |
| Organic | 161 | 54 | 107 | 190 | 112 | 78 |
| $CO_2$ | 75 | 58 | 16 | 86 | 69 | 18 |
| $SO_3$ | 68 | 44 | 24 | 72 | 23 | 49 |
| Cl | 11 | 0 | 11 | 18 | 0 | 18 |
| $SiO_2$ | 346 | 245 | 101 | 412 | 269 | 143 |
| CaO | 327 | 310 | 17 | 257 | 161 | 96 |
| $Fe_2O_3$ | 110 | 70 | 40 | 158 | 101 | 57 |
| $Al_2O_3$ | 103 | 78 | 25 | 152 | 109 | 44 |
| HgO | 23 | 18 | 5 | 27 | 18 | 9 |
| $Na_2O$ | 13 | 3 | 10 | 19 | 8 | 11 |
| $K_2O$ | 9 | 2 | 7 | 12 | 6 | 7 |
| PbO | 5 | 3 | 2 | 8 | 6 | 2 |

TABLE XII-continued

| | Product[1] | | | Untreated Ash[1] | | |
|---|---|---|---|---|---|---|
| Element | Before Leaching | After Leaching | Difference | Before Leach. | After Leach. | Difference |
| CuO | 3 | 2 | 1 | 6 | 4 | 2 |
| ZnO | 14 | 8 | 6 | 21 | 15 | 5 |
| MnO | 2 | 1 | 1 | 3 | 2 | 1 |
| BaO | 1 | 0 | 1 | 2 | 1 | 0 |
| Total | 1447 | 1000 | 447 | 1573 | 1000 | 573 |

[1] Data taken from elemental composition analysis of grain sizes passing the standard No. 35 screen.
[2] LOI = Loss on Ignition.
[3] Data are given in parts per 1000 by weight.

TABLE XIII

| | Leachate[1] Conc. mg/kg[2] | | Elemental Anal.[3] Concen. mg/kg | | Concentration Ratios EA/L[4] | |
|---|---|---|---|---|---|---|
| | Prod. | Ash | Prod. | Ash | Prod. | Ash |
| L/S[5] | 4.72 | 3.85 | | | | |
| pH | 12.38 | 10.56 | | | | |
| sodium | 4484 | 1609 | 3557 | 4002 | 0.8 | 2.5 |
| potassium | 3947 | 968 | 2908 | 2713 | 0.7 | 2.8 |
| calcium | 3835 | 2977 | 12371 | 68881 | 3.2 | 23.1 |
| lead | 2 | NA | 1857 | 1999 | 1127.8 | NA |
| chloride | 4699 | 6163 | 10826 | 18020 | 2.3 | 2.9 |
| sulfate | 216 | 2813 | 29397 | 58787 | 136.3 | 20.9 |
| TDS[6] | 28951 | 17039 | 60916 | 154402 | 2.1 | 9.1 |

[1] All analytical concentrations are corrected to mg/kg of solid.
[2] Cumulative leachate concentrations from water samples.
[3] Elemental analysis of solids passing the standard No. screen.
[4] Concentration Ratios are obtained by dividing the result for the Elemental Analysis by the respective leachate weight.
[5] Liquid to solid weight ratio.
[6] Total dissolved solids.

Various modifications can be made in the details of the embodiments of the apparatus and the process of the present invention, all within the spirit and scope of the invention as defined in the appended claims.

We claim:

1. A process for disposing of untreated residue produced by the incineration of commercial, industrial or municipal waste, the process comprising:

(a) mixing the untreated residue with Portland cement;

(b) aggregating the mixture of the residue and the Portland cement into a free-flowing, granular treated residue;

(c) shaping the treated residue; and (d) permitting the shaped residue to cure into a cohesive mass.

2. A process for disposing of untreated residue produced by the incineration of commercial, industrial or municipal waste and for increasing the hydraulic conductivity of a mass of the untreated residue, the process comprising:

(a) mixing the untreated residue with Portland cement;

(b) aggregating the mixture of the residue and the Portland cement into a free-flowing, granular treated residue;

(c) shaping the treated residue; and (d) permitting the shaped residue to cure into a cohesive mass, the cohesive mass having greater hydraulic conductivity than a mass of untreated residue.

3. A process for producing a product for disposing of untreated residue produced by the incineration of commercial, industrial or municipal waste and for increasing the hydraulic conductivity of the untreated residue, the process comprising:

(a) mixing the untreated residue with Portland cement to provide a mixture, the mixture initially including free water, the initial free water content of the mixture being less than that sufficient to fully cure the cement, the ratio of Portland cement to untreated residue being selected to control reduction of the surface area of the product formed by reducing the fines within the product formed;

(b) aggregating the mixture of the residue and the Portland cement into a free-flowing, granular treated residue, the mixture being aggregated within a pelletizing apparatus to give a product having no more than about five percent by weight fines.

4. A process according to claim 1 wherein the aggregation agent is Type II Portland cement.

5. A process according to claim 1 wherein the weight ratio of Portland cement to untreated residue solids is from about 0.07 to 0.21.

6. A process according to claim 5 wherein the weight ratio of Portland cement to untreated residue solids is about 0.14.

7. A process according to claim 1 wherein the untreated residue and aggregation agent are mixed continuously, the untreated residue and the aggregation agent each being delivered continuously for mixing.

8. A process according to claim 1 further comprising adjusting the moisture content of the untreated residue.

9. A process according to claim 8 wherein the moisture content of the untreated residue is adjusted prior to aggregating the untreated residue and the aggregation agent.

10. A process according to claim 9 wherein the moisture content of the untreated residue is increased by adding water to the untreated residue as it is being transported for mixing with the aggregation agent.

11. A process according to claim 10 wherein the relative proportions of untreated residue, added water and cement are selected to provide treated residue which contain no more than about five percent by weight fines.

12. A process according to claim 10 wherein the relative proportions of untreated residue, added water and cement are selected to provide a product having a hydraulic conductivity of at least about 0.001 cm/sec after curing for 24 hours.

13. A process according to claim 7 wherein the rate of water addition and rate of addition of aggregation agent are adjusted to provide an added water to added Portland cement ratio of about 0.4.

14. A process according to claim 1 further comprising permitting the treated residue to cure for at least about 18 hours after the treated residue is formed before further processing.

15. A process according to claim 1 further comprising removing oversize material and ferrous materials from the residue before mixing the untreated residue with the aggregation agent.

16. A process according to claim 1 further comprising providing a cementitious coating on the treated residue to provide coated pellets.

17. A process according to claim 16 wherein the cementitious coating is formed by rolling the untreated residue together with a cementitious coating composition.

18. A process according to claim 17 wherein the cementitious coating composition comprises Portland cement.

19. A process according to claim 1 further comprising mixing the untreated residue with a heavy metals treatement agent to reduce leaching of heavy metals from the layer.

20. A process according to claim 19 wherein the heavy metal treatment agent is a high silica, high surface area, low moisture content clay.

21. A process according to claim 20 wherein the heavy metal treatment agent is diatomaceous clay.

* * * * *